(12) United States Patent
Kikuta et al.

(10) Patent No.: US 12,523,883 B2
(45) Date of Patent: Jan. 13, 2026

(54) FLOATING IMAGE DISPLAY DEVICE AND FLOATING IMAGE DISPLAY METHOD

(71) Applicants: Mitsubishi Electric Corporation, Tokyo (JP); MITSUBISHI ELECTRIC ENGINEERING COMPANY, LIMITED, Tokyo (JP)

(72) Inventors: Hayato Kikuta, Tokyo (JP); Masahiko Sakai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 35 days.

(21) Appl. No.: 18/568,848

(22) PCT Filed: Jun. 16, 2021

(86) PCT No.: PCT/JP2021/022776
§ 371 (c)(1),
(2) Date: Dec. 11, 2023

(87) PCT Pub. No.: WO2022/264294
PCT Pub. Date: Dec. 22, 2022

(65) Prior Publication Data
US 2024/0280830 A1    Aug. 22, 2024

(51) Int. Cl.
*G02B 30/56*    (2020.01)
*G09G 3/34*    (2006.01)

(52) U.S. Cl.
CPC .......... *G02B 30/56* (2020.01); *G09G 3/3413* (2013.01)

(58) Field of Classification Search
CPC ........ G02B 30/56; G09G 3/3413; G09G 3/20; G09G 5/00; G09G 5/10; G09G 5/38
See application file for complete search history.

(56) References Cited

U.S. PATENT DOCUMENTS

| 6,481,851 B1 * | 11/2002 | McNelley | G03B 15/10 |
| | | | 359/488.01 |
| 2005/0111101 A1 * | 5/2005 | Dike | G02B 27/28 |
| | | | 359/489.07 |

(Continued)

FOREIGN PATENT DOCUMENTS

| JP | 2011-257496 A | 12/2011 |
| JP | 2015-040943 A | 3/2015 |

(Continued)

OTHER PUBLICATIONS

International Search Report and Written Opinion mailed on Sep. 7, 2021, received for PCT Application PCT/JP2021/022776, filed on Jun. 16, 2021, 11 pages including English Translation.

(Continued)

*Primary Examiner* — Timothy R Newlin
(74) *Attorney, Agent, or Firm* — XSENSUS LLP

(57) ABSTRACT

A floating image display device includes an image display unit to display an image based on image data, an image formation optical system to make the image form an image as a floating image, a viewpoint information acquisition unit to acquire viewpoint information indicating a position of eyes of an observer, an ambient light information acquisition unit to acquire ambient light information indicating information on ambient light heading for the image formation optical system, an image quality deterioration region estimation unit to estimate an image quality deterioration region on the image display unit corresponding to an ambient light passage region, as a region where light included in the ambient light, reflected by the image formation optical system and heading for the position of the eyes passes through the floating image, based on the viewpoint information and the ambient light information, and a display processing unit.

23 Claims, 10 Drawing Sheets

(56) References Cited

U.S. PATENT DOCUMENTS

| | | | |
|---|---|---|---|
| 2010/0214394 A1* | 8/2010 | Maekawa | G02B 30/56 348/51 |
| 2013/0009863 A1* | 1/2013 | Noda | G09G 3/003 345/87 |
| 2014/0267284 A1* | 9/2014 | Blanche | G09G 3/003 345/428 |
| 2014/0355114 A1* | 12/2014 | Grauzinis | G02B 30/56 359/479 |
| 2017/0208292 A1* | 7/2017 | Smits | G03H 1/0005 |
| 2018/0024373 A1* | 1/2018 | Joseph | G02B 30/56 359/629 |
| 2018/0373030 A1* | 12/2018 | Kusanagi | G06V 40/16 |
| 2019/0033649 A1* | 1/2019 | Okuyama | G02F 1/1337 |
| 2020/0218085 A1* | 7/2020 | Chiu | G06F 1/1639 |
| 2021/0055547 A1* | 2/2021 | Rao | G09G 5/38 |
| 2021/0082322 A1* | 3/2021 | Chen | G02F 1/133528 |
| 2022/0107606 A1* | 4/2022 | Vallet | G02F 1/133626 |
| 2022/0343876 A1* | 10/2022 | Seder | B60K 35/80 |
| 2023/0029822 A1* | 2/2023 | Ogawa | G02B 27/017 |
| 2023/0288724 A1* | 9/2023 | Hirata | G02B 6/0048 |
| 2023/0360612 A1* | 11/2023 | Furuya | G02B 5/32 |
| 2024/0005825 A1* | 1/2024 | Takahashi | G06F 3/0346 |
| 2024/0125985 A1* | 4/2024 | Akimoto | G02B 30/56 |

FOREIGN PATENT DOCUMENTS

| | | |
|---|---|---|
| JP | 2019-028105 A | 2/2019 |
| JP | 2019-035810 A | 3/2019 |
| WO | 2020/194699 A1 | 10/2020 |

OTHER PUBLICATIONS

Notice of Reasons for Refusal mailed on Jan. 18, 2022, received for JP Application 2021-571768, 10 pages including English Translation.

* cited by examiner

FLOATING IMAGE DISPLAY DEVICE AND FLOATING IMAGE DISPLAY METHOD

CROSS-REFERENCE TO RELATED APPLICATION

This application is a national stage application filed under 35 U.S.C. § 371 based on International Patent Application No. PCT/JP2021/022776, filed Jun. 16, 2021, the entire contents of which are incorporated herein by reference.

TECHNICAL FIELD

The present disclosure relates to a floating image display device and a floating image display method.

BACKGROUND ART

There has been known a floating image display device employing floating image formation technology for displaying an image in the air. See Patent Reference 1, for example.

A floating image display device in the Patent Reference 1 changes the display content of the floating image depending on the condition of an observer. Specifically, the floating image display device in the Patent Reference 1 has a function of controlling display quality (e.g., luminance, contrast or the like) of the floating image depending on the position of the eyes of the observer. With this function, a floating image having image quality suitable for the position of the eyes of the observer is displayed.

PRIOR ART REFERENCE

Patent Reference

Patent Reference 1: WO 2020/194699

SUMMARY OF THE INVENTION

Problem to be Solved by the Invention

However, the image quality of the floating image visually recognized by the observer changes depending on not only the position of the eyes of the observer but also lighting environment around the floating image display device. For example, when ambient light is incident upon the floating image display device of the Patent Reference 1, stray light occurs and the image quality of the floating image adapted to the position of the eyes of the observer deteriorates. There is a problem in that the observer's visibility deteriorates in such cases.

An object of the present disclosure is to display a floating image adapted to the position of the eyes of the observer and the ambient light.

Means for Solving the Problem

A floating image display device according to an aspect of the present disclosure includes an image display unit to display an image based on image data; an image formation optical system to make the image form an image as a floating image; a viewpoint information acquisition unit to acquire viewpoint information indicating a position of eyes of an observer; an ambient light information acquisition unit to acquire ambient light information indicating information on ambient light heading for the image formation optical system; an image quality deterioration region estimation unit to estimate an image quality deterioration region on the image display unit corresponding to an ambient light passage region, as a region where light included in the ambient light, reflected by the image formation optical system and heading for the position of the eyes passes through the floating image, based on the viewpoint information and the ambient light information; and a display processing unit to correct the image based on the image quality deterioration region.

A floating image display method according to another aspect of the present disclosure is a floating image display method for a floating image display device including an image display unit to display an image based on image data and an image formation optical system to make the image form an image as a floating image. The method includes acquiring viewpoint information indicating a position of eyes of an observer, acquiring ambient light information indicating information on ambient light heading for the image formation optical system, estimating an image quality deterioration region on the image display unit corresponding to an ambient light passage region, as a region where light included in the ambient light, reflected by the image formation optical system and heading for the position of the eyes passes through the floating image, based on the viewpoint information and the ambient light information, and correcting the image based on the image quality deterioration region.

Effect of the Invention

According to the present disclosure, a floating image adapted to the position of the eyes of the observer and the ambient light can be displayed.

MODE FOR CARRYING OUT THE INVENTION

A floating image display device and a floating image display method according to each embodiment of the present disclosure will be described below with reference to the drawings. The following embodiments are just examples and it is possible to appropriately combine embodiments and appropriately modify each embodiment.

First Embodiment

<Configuration of Floating Image Display Device>

Figure 1:
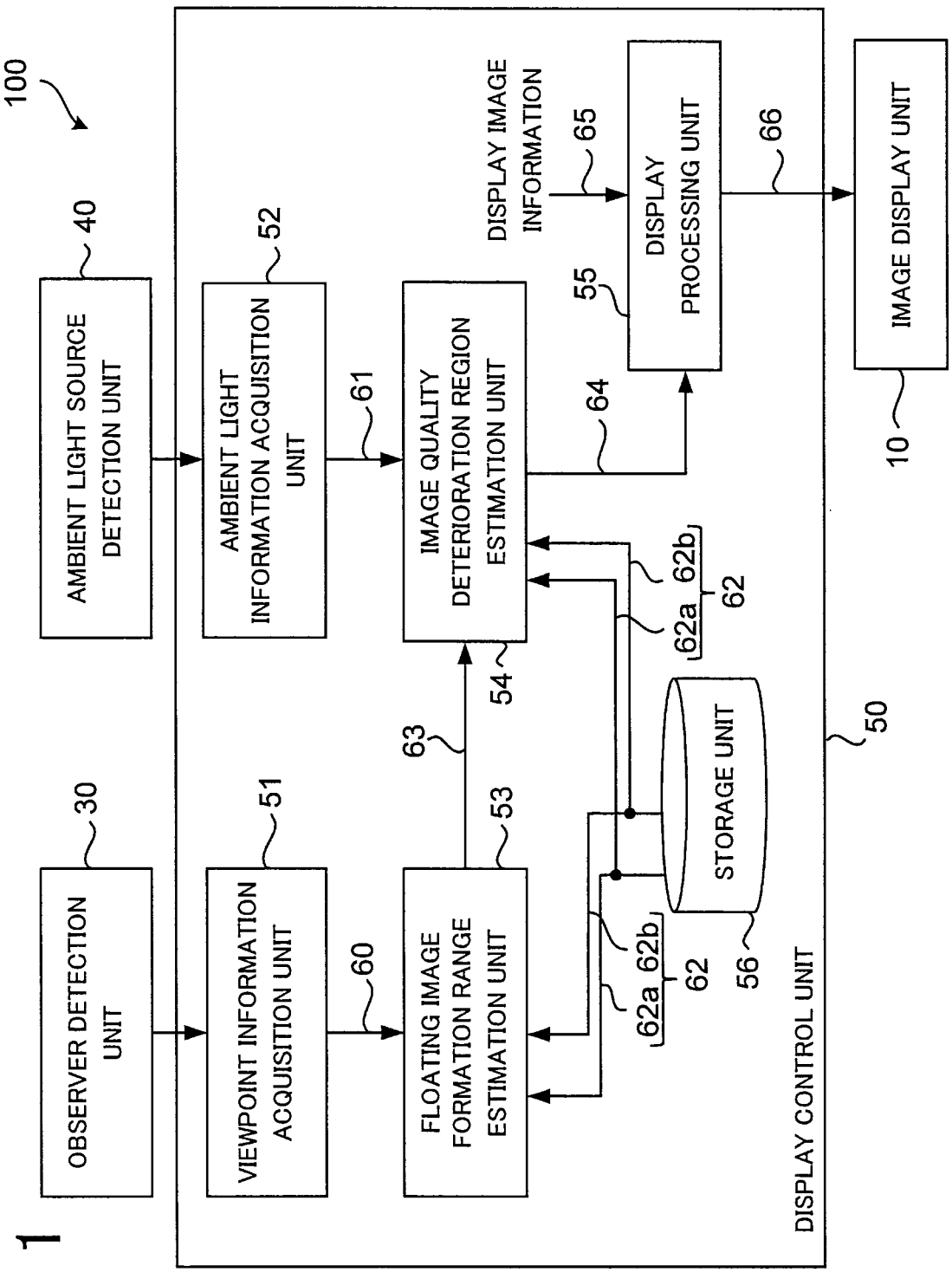
FIG. 1 is a block diagram showing the configuration of a floating image display device according to a first embodiment.
Figure 2:
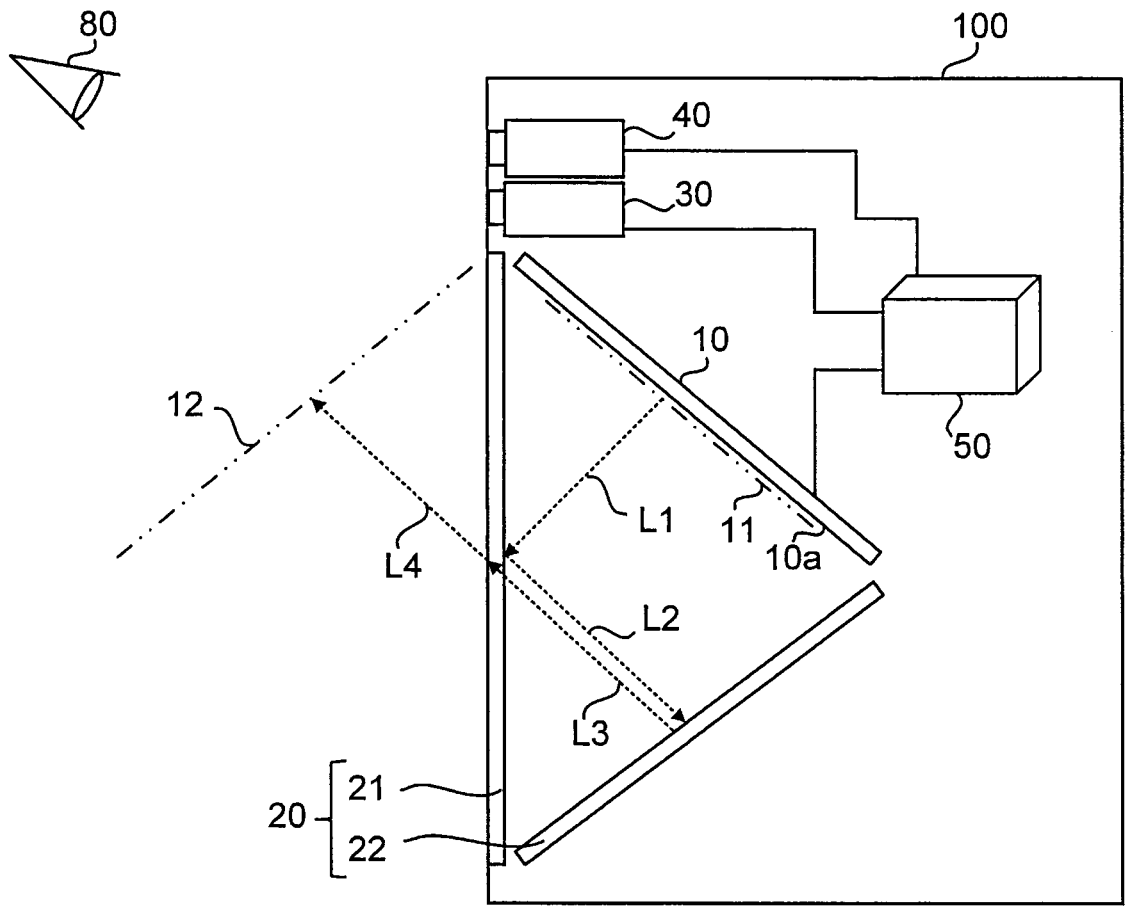
FIG. 2 is an explanatory diagram for explaining the general configuration of the floating image display device according to the first embodiment.

FIG. 1 is a block diagram showing the configuration of a floating image display device 100 according to a first embodiment. FIG. 2 is an explanatory diagram for explaining the general configuration of the floating image display device 100 according to the first embodiment. As shown in FIGS. 1 and 2, the floating image display device 100 includes an image display unit 10, a floating image formation optical system 20 as an image formation optical system, an observer detection unit 30, an ambient light source detection unit 40, a viewpoint information acquisition unit 51, an ambient light information acquisition unit 52, an image quality deterioration region estimation unit 54, and a floating image display processing unit 55 as a display processing unit.

The image display unit 10 is a display device that displays an image 11. The image display unit 10 includes a backlight light source (not shown) as a light source and a display surface 10a that displays the image 11. The image display unit 10 emits first light L1 as light (hereinafter referred to also as "image light") of the image 11 towards a beam splitter 21 of the floating image formation optical system 20. The first light L1 is diffuse light that diffuses around the display surface 10a.

The floating image formation optical system 20 makes the image 11 form an image as a floating image 12. In the example shown in FIGS. 1 and 2, the floating image formation optical system 20 includes the beam splitter 21 and a retroreflective sheet 22 as a retroreflective member.

The beam splitter 21 is an optical member that reflects the first light L1 emitted from the image display unit 10 and emits the reflected light as second light L2 heading towards the retroreflective sheet 22. In the following description, the direction in which the second light L2 travels towards the retroreflective sheet 22 is referred to as an "emission direction".

The retroreflective sheet 22 retroreflects the second light L2. Specifically, the retroreflective sheet 22 reflects the second light L2 towards the emission direction of the second light L2 and emits the reflected light as third light L3 heading towards the beam splitter 21.

The third light L3 passes through the beam splitter 21. The beam splitter 21 allows the third light L3 to pass through and emits the light as fourth light L4 heading towards the eyes 80 of the observer. The fourth light L4 forms an image in the air where there is no display element. By this process, the floating image 12 based on the image 11 is displayed in the air, and thus the observer can visually recognize (perceive) the floating image 12.

The viewpoint information acquisition unit 51 acquires viewpoint information 60 indicating the position of the eyes 80 of the observer. The viewpoint information acquisition unit 51 calculates the viewpoint information 60 based on a result of detection by the observer detection unit 30. The viewpoint information acquisition unit 51 outputs the acquired viewpoint information 60 to the image quality deterioration region estimation unit 54.

The ambient light information acquisition unit 52 acquires ambient light information 61 indicating information on ambient light heading for the floating image formation optical system 20. The ambient light information acquisition unit 52 calculates the ambient light information 61 based on a result of detection by the ambient light source detection unit 40. In the first embodiment, the ambient light information 61 includes information indicating the position of a light source (e.g., ambient light source 90 shown in FIGS. 4 and 5 which will be explained later) of the ambient light and information indicating intensity of the ambient light. The ambient light information acquisition unit 52 outputs the acquired ambient light information 61 to the image quality deterioration region estimation unit 54. It is permissible if the ambient light information 61 includes information indicating at least one of the position of the light source of the ambient light and the intensity of the ambient light.

As shown in FIG. 1, the image quality deterioration region estimation unit 54 estimates an image quality deterioration region (e.g., image quality deterioration region R3 shown in FIGS. 7 and 8 which will be explained later) based on the viewpoint information 60 and the ambient light information 61. The image quality deterioration region estimation unit 54 outputs the result of the estimation as image quality deterioration region information 64 to the floating image display processing unit 55.

The floating image display processing unit 55 corrects the image 11 based on the image quality deterioration region information 64. By this, the floating image 12 adapted to the position of the eyes 80 of the observer and the ambient light can be displayed. Accordingly, the deterioration in the observer's visibility in regard to the floating image 12 can be prevented even when an illuminating light source or the like exists in the vicinity of the floating image display device 100.

The viewpoint information acquisition unit 51, the ambient light information acquisition unit 52, the image quality deterioration region estimation unit 54 and the floating image display processing unit 55 described above are included in a display control unit 50. The viewpoint information acquisition unit 51 and the observer detection unit 30 may also be integral with each other, and the ambient light information acquisition unit 52 and the ambient light source detection unit 40 may also be integral with each other.

Next, details of each component of the floating image display device 100 will be described below. The image display unit 10 displays the image 11 that is based on display image information 65 as image data. The image display unit 10 is, for example, a display device including a two-dimensional flat surface light source. The image display unit 10 is, for example, a liquid crystal display including liquid crystal elements and a backlight light source. The image display unit 10 can also be a display device of the self-luminous type including organic EL (ElectroLuminescence) elements or LEDs (Light Emitting Diodes).

The image display unit 10 is not limited to a display device including a flat surface light source but can also be a display having a curved surface, a display arranged three-dimensionally, a stereoscopic display including LEDs, or the like. Further, the image display unit 10 can also be a display that includes a lens optical system and a barrier control unit and thereby makes use of stereoscopic vision due to binocular parallax or kinematic parallax of the observer. The light source of the image display unit 10 is not limited to LEDs but can also be an illuminating light source such as a halogen lamp. Furthermore, the image display unit 10 can also be a projection device including a projector and a screen.

The beam splitter 21 is an optical member that splits incident light into transmitted light and reflected light. The beam splitter 21 is formed from a transparent plate (e.g., acrylic plate) made of resin, a glass plate, or the like. In the case of the transparent plate made of resin, the intensity of the transmitted light is generally higher than the intensity of the reflected light. Thus, in the case where the beam splitter 21 is formed from the transparent plate made of resin, the reflection intensity may be increased by adding a metallic membrane to the transparent plate. In this case, the beam splitter 21 can be a half mirror. The beam splitter 21 can also be, for example, a reflective polarizing plate that transmits or reflects light incident from a liquid crystal element or a thin-film element depending on the polarization state of the incident light. Further, the beam splitter 21 can also be a reflective polarizing plate whose ratio between the transmittance and the reflectance changes depending on the polarization state of the incident light.

The retroreflective sheet 22 is a sheet-like optical member. The retroreflective sheet 22 has the retroreflective property to reflect the incident light towards the incidence direction of the incident light. The retroreflective sheet 22 is a retroreflective sheet of the so-called bead type, for example. In the retroreflective sheet of the bead type, a plurality of minute glass beads have been encapsulated, and each glass bead has mirror surfaces. The retroreflective sheet 22 can also be a retroreflective sheet of the so-called prism type. On the retroreflective sheet of the prism type, a plurality of minute microprisms are arrayed, and each microprism has mirror surfaces. The microprism is, for example, a triangular pyramid prism in a convex shape or a hollow triangular pyramid prism.

Here, a principle on which the image light forms an image as the floating image 12 in the space in which the observer exists will be explained below. In the first embodiment, the image light of the image 11 displayed on the display surface 10a of the image display unit 10 is made to form an image as the floating image 12 by an optical system formed with the image display unit 10, the beam splitter 21 and the retroreflective sheet 22. Specifically, the first light L1 as the image light incident upon the beam splitter 21 from the image display unit 10 is split into the second light L2 as the reflected light and the transmitted light (not shown). The second light L2 is retroreflected by the retroreflective sheet 22 and is incident upon the beam splitter 21 again as the third light L3. The third light L3 is split by the beam splitter 21 into reflected light (not shown) and the fourth light L4 as transmitted light. The fourth light L4 arrives at the eyes 80 of the observer.

As above, part of the first light L1 emitted from the image display unit 10 travels in an optical path of being reflected by the beam splitter 21, thereafter retroreflected by the beam splitter 21, and thereby passing through the beam splitter 21. Here, the first light L1 is diffuse light as mentioned earlier. Thus, the diffuse light emitted from the image display unit 10 converges at a position that is plane-symmetrical with reference to the beam splitter 21. The converged light diffuses again from the convergence position and arrives at the eyes 80 of the observer. Accordingly, the observer can visually recognize the floating image 12 based on the image 11.

Figure 3:
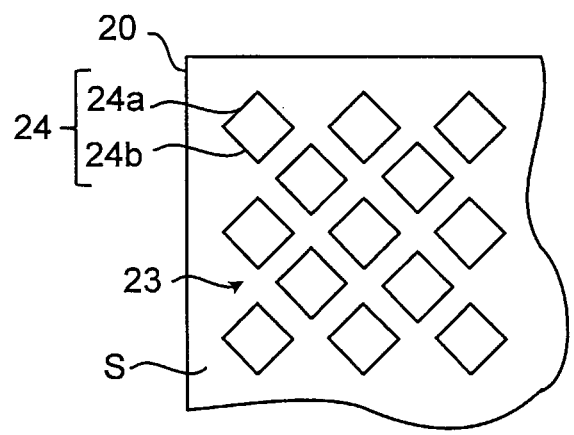
FIG. 3 is a plan view showing another example of an image formation optical system of the floating image display device according to the first embodiment.

The floating image formation optical system 20 is not limited to the configuration shown in FIG. 2 but can be implemented by other configurations. FIG. 3 is a schematic diagram showing another example of the floating image formation optical system 20 of the floating image display device 100 according to the first embodiment. In the example shown in FIG. 3, the floating image formation optical system 20 includes a dihedral corner reflector array 23. The dihedral corner reflector array 23 includes a plurality of dihedral corner reflectors 24 arrayed on a plane S. The dihedral corner reflector 24 includes two mirror surfaces 24a and 24b orthogonal to each other, and light reflected by one of the two mirror surfaces 24a and 24b is then reflected also by the other mirror surface. Accordingly, the image light forms an image at a position that is plane-symmetrical with reference to the dihedral corner reflector array 23, and thus the observer can visually recognize the floating image 12.

Next, returning to FIGS. 1 and 2, details of the configuration of the observer detection unit 30 and the viewpoint information acquisition unit 51 will be described below. The observer detection unit 30 is, for example, an image capturing device such as a camera. The observer detection unit 30 captures an image including the observer. The observer detection unit 30 is a compound eye camera, for example. In this case, the viewpoint information acquisition unit 51 is capable of calculating the viewpoint information 60 indicating the position of the eyes 80 of the observer based on three-dimensional position information on the observer included in the image captured by the observer detection unit 30. The observer detection unit 30 can also be a monocular camera. In this case, the viewpoint information acquisition unit 51 is capable of calculating the viewpoint information 60 by, for example, estimating the position of the eyes 80 in a three-dimensional space coordinate system by use of an optical flow or estimating the position of the eyes 80 based on facial feature points.

The observer detection unit 30 is not limited to an image capturing device such as a camera but can also be a three-dimensional distance sensor using infrared rays. In this case, the viewpoint information acquisition unit 51 acquires the viewpoint information 60 by detecting a relative position between the position where the observer is standing and the floating image display device 100.

The viewpoint information acquisition unit 51 may acquire the viewpoint information 60 by estimating the position of the observer based on previously stored physical information on the observer. The physical information is, for example, the body height of the observer. Further, the physical information is, for example, information indicating whether a wheelchair is used or not and sitting height information on the observer. For example, when the wheelchair is "used" and the sitting height information has previously been stored, the viewpoint information acquisition unit 51 estimates the height from the floor surface to the position of the eyes 80 of the observer based on a value as the sum total of the height of the seat of a generic wheelchair and the sitting height of the observer. The viewpoint information acquisition unit 51 acquires the result of the calculation as the viewpoint information 60.

Next, details of the configuration of the ambient light source detection unit 40 and the ambient light information acquisition unit 52 will be described below. The ambient light source detection unit 40 is, for example, an image capturing device such as a camera. The ambient light source detection unit 40 detects the position of the light source of the ambient light (hereinafter referred to also as "external light"), for example, by capturing an image of a scene in the vicinity of the floating image display device 100. The ambient light source detection unit 40 is, for example, an image capturing device such as a camera having a wide-range lens. The ambient light source detection unit 40 and the observer detection unit 30 may also be included in the same image capturing device.

The ambient light information acquisition unit 52 acquires the ambient light information 61 based on the image captured by the ambient light source detection unit 40. Specifically, the ambient light information acquisition unit 52 detects a high-grayscale part in the image captured by the ambient light source detection unit 40 and calculates the incidence direction of the ambient light (in other words, the position of the light source of the ambient light) based on a field angle position of the high-grayscale part. Further, the ambient light information acquisition unit 52 calculates the intensity of the ambient light based on the grayscale values of the image captured by the ambient light source detection unit 40.

The ambient light source detection unit 40 may include an illuminometer that measures the amount of luminous flux of the ambient light applied to a unit area as the illuminance. The ambient light source detection unit 40 may include, for example, a plurality of illuminometers having directivity different from each other. In other words, the ambient light source detection unit 40 may include a plurality of illuminometers arrayed radially. Suppose that the ambient light source detection unit 40 includes one illuminometer, only the illuminance of ambient light heading from a particular position towards the floating image formation optical system 20 is measured. However, by radially arranging a plurality of illuminometers, the incidence direction and the intensity of the ambient light can be calculated based on the illuminance measured by each of the illuminometers.

Next, details of the configuration of the display control unit 50 will be described below by using FIG. 1. As shown in FIG. 1, the display control unit 50 includes a floating image formation range estimation unit 53, the image quality deterioration region estimation unit 54 and the floating image display processing unit 55.

The floating image formation range estimation unit 53 estimates a range in which the floating image 12 visible to the observer is formed (hereinafter referred to also as a "floating image formation range") based on the viewpoint information 60 and floating image formation structure information 62. The floating image formation range is an image display range visible to the observer, included in the display surface 10*a* (see FIG. 2) of the image display unit 10, represented as position information regarding a two-dimensional plane. The floating image formation range estimation unit 53 generates floating image formation range information 63 as information indicating the floating image formation range and outputs the floating image formation range information 63 to the image quality deterioration region estimation unit 54.

The floating image formation structure information 62 includes optical system specification information 62*a* and optical system arrangement information 62*b*. The floating image formation structure information 62 has previously been stored in a storage unit 56 as a parameter storage unit, for example.

The optical system specification information 62*a* is, for example, specifications indicating the structure and the function of each of the image display unit 10, the beam splitter 21 and the retroreflective sheet 22. Specifically, the optical system specification information 62*a* includes at least one of luminance, resolution and a viewing angle of the image display unit 10, a plate thickness, transmittance and reflectance of the beam splitter 21, and retroreflection accuracy of the retroreflective sheet 22.

The optical system arrangement information 62*b* is information indicating a positional relationship in the floating image formation optical system 20. In the first embodiment, the optical system arrangement information 62*b* is information indicating a spatial positional relationship between the beam splitter 21 and the retroreflective sheet 22, for example. The optical system arrangement information 62*b* includes three-dimensional position information such as 3D-CAD data, for example.

As above, the optical system arrangement information 62*b* includes information indicating a positional relationship of optical members for forming the floating image 12. Therefore, the floating image formation range estimation unit 53 is capable of estimating the position of the floating image 12 formed in the space. For example, when the floating image formation optical system 20 uses retroreflection as in the first embodiment, the observer can visually recognize the floating image 12 since the beam splitter 21 exists on the observer's line of sight and the retroreflective sheet 22 exists on the optical path of light after passing through or being reflected by the beam splitter 21. In other words, the floating image formation range estimation unit 53 is capable of estimating the range on the display surface 10*a* of the image display unit 10 that can be visually recognized by the observer as the floating image 12, namely, the floating image formation range, by executing optical path tracking of light in a three-dimensional coordinate system based on the viewpoint information 60 and the floating image formation range information 63.

The floating image formation range can be estimated even in the case where the floating image formation optical system 20 includes the dihedral corner reflector array 23 shown in FIG. 3. In the dihedral corner reflector array 23, incident light is reflected once by each of the two mirror surfaces 24*a* and 24*b* orthogonal to each other, by which the light is made to form an image. Therefore, the floating image formation range estimation unit 53 is capable of estimating that the floating image 12 is not visually recognized by the observer when it is judged that the light is reflected once or less or three times or more based on the relationship between the dihedral corner reflector array 23 and the incidence angle of the light.

The image quality deterioration region estimation unit 54 generates the image quality deterioration region information 64 based on the ambient light information 61, the floating image formation structure information 62 and the floating image formation range information 63, and outputs the image quality deterioration region information 64 to the floating image display processing unit 55.

Specifically, the image quality deterioration region estimation unit 54 estimates the image quality deterioration region (e.g., the image quality deterioration region R3 shown in FIG. 7C and FIG. 8C which will be explained later) on the image display unit 10 based on the viewpoint information 60, the ambient light information 61, the optical system specification information 62*a* and the optical system arrangement information 62*b*. The image quality deterioration region is a region corresponding to an ambient light passage region of the floating image 12. Here, the ambient light passage region is a region where light included in the ambient light, reflected by the floating image formation optical system 20, and heading for the position of the eyes 80 of the observer (e.g., light L22 shown in FIG. 4 which will be explained later) passes through the floating image 12.

The optical system specification information 62a used for the estimation of the image quality deterioration region includes, for example, information indicating the material of the beam splitter 21. The material of the beam splitter 21 is one of an acrylic plate, a glass plate, a half mirror and a reflective polarizing plate. The optical system specification information 62a further includes information indicating the structure of the retroreflective sheet 22. Specifically, the optical system specification information 62a further includes information indicating the retroreflective sheet 22 of the bead type, the retroreflective sheet 22 of the prism type, and the size of the retroreflective sheet 22. The optical system specification information 62a further includes information indicating specifications of the image display unit 10. Specifically, the optical system specification information 62a further includes information indicating specifications of a liquid crystal display or a display device of the self-luminous type including organic EL elements or LEDs.

The optical system arrangement information 62b used for the estimation of the image quality deterioration region includes, for example, information indicating a positional relationship between an optical member for making the image light form an image (in the first embodiment, the beam splitter 21 and the retroreflective sheet 22) and the image display unit 10.

Here, a factor causing the deterioration in the observer's visibility in regard to the floating image 12, namely, deterioration in the image quality, is to cause the observer to visually recognize light different from the light of the floating image 12 due to the relationship between the optical members forming the floating image display device 100 and external light environment outside the floating image display device 100.

For example, the deterioration in the image quality is caused by superimposition of external light such as illuminating light on the light forming the floating image 12. By the superimposition, the floating image 12 is visually recognized in a state in which at least one of luminance, contrast and chromaticity included in visual information desired by the observer has changed, and thus the observer's visibility deteriorates. Further, when locally high-luminance external light such as a spotlight is superimposed on the light of the floating image 12, the observer's visual function changes due to control of the visual function by opening/closing pupils or eyelids. Accordingly, the observer's visibility in a vicinal region in the vicinity of the position where the external light passes through the floating image 12 also deteriorates.

Furthermore, when the external light passing through the floating image 12 is not the illuminating light but light from a projector arranged in the vicinity or light from a display device different from the image display unit 10, an unclear edge and color mixture occur in the floating image 12. In this case, the resolution and sharpness deteriorate, in addition to the luminance, the contrast and the chromaticity of the floating image 12.

The image quality deterioration region information 64 is information indicating the above-described factor deteriorating the image quality of the floating image 12 in regard to each pixel of the floating image 12. The image quality deterioration region information 64 indicates a deterioration level of each of at least one or more parameters among the luminance, the contrast, the chromaticity, the resolution and the sharpness at each pixel unit. The image quality deterioration region information 64 is two-dimensional map information indicating the deterioration levels of the parameters.

For example, the deterioration level of the luminance ($cd/m^2$) is represented by difference data between the maximum luminance of the pixel before the external light passes through the floating image 12 and the maximum luminance of the pixel when the external light passes through the floating image 12. The deterioration level of the contrast is represented by difference data between the contrast before the external light passes through the floating image 12 and the contrast when the external light passes through the floating image 12. Here, the contrast is represented by the ratio between the luminance of the floating image 12 at the time of maximum grayscale display and the luminance of the floating image 12 at the time of minimum grayscale display.

The deterioration level of the chromaticity is represented by the level of the change in the chromaticity of a unit color when the floating image 12 is displayed (e.g., RGB or the like of the pixel) caused by the external light. A change rate of the color space indicating the deterioration level of the chromaticity is, for example, a change amount of each of the x-coordinate and the y-coordinate in an xyz color model. When the floating image 12 is displayed by use of a digital image, the deterioration level of the chromaticity is represented by data obtained by mapping the grayscale change amount at each grayscale value of RGB onto an LUT (Look UP Table) or the like.

The deterioration level of each of the resolution and the sharpness is calculated based on a relationship between a frequency analysis result of sensitivity in the entire display region and at the edge of the image and the presence/absence of the external light. For example, the deterioration level of each of the resolution and the sharpness is represented by difference data between data when a frequency characteristic housing a maximum frequency is influenced by the external light and data when the frequency characteristic is not influenced by the external light included in the frequency analysis result. Here, the edge of the image is a luminance boundary part where the luminance of the image changes. Further, for the frequency analysis of the contrast sensitivity, a contrast transfer function is used, for example. The maximum frequency of the contrast sensitivity is a frequency component having signal intensity higher than or equal to a previously set threshold value.

The floating image display processing unit 55 generates output image information 66 based on the image quality deterioration region information 64 and the display image information 65 and outputs the output image information 66 to the image display unit 10.

<Deterioration in Image Quality of Floating Image Due to Influence of Ambient Light>

Figure 4:
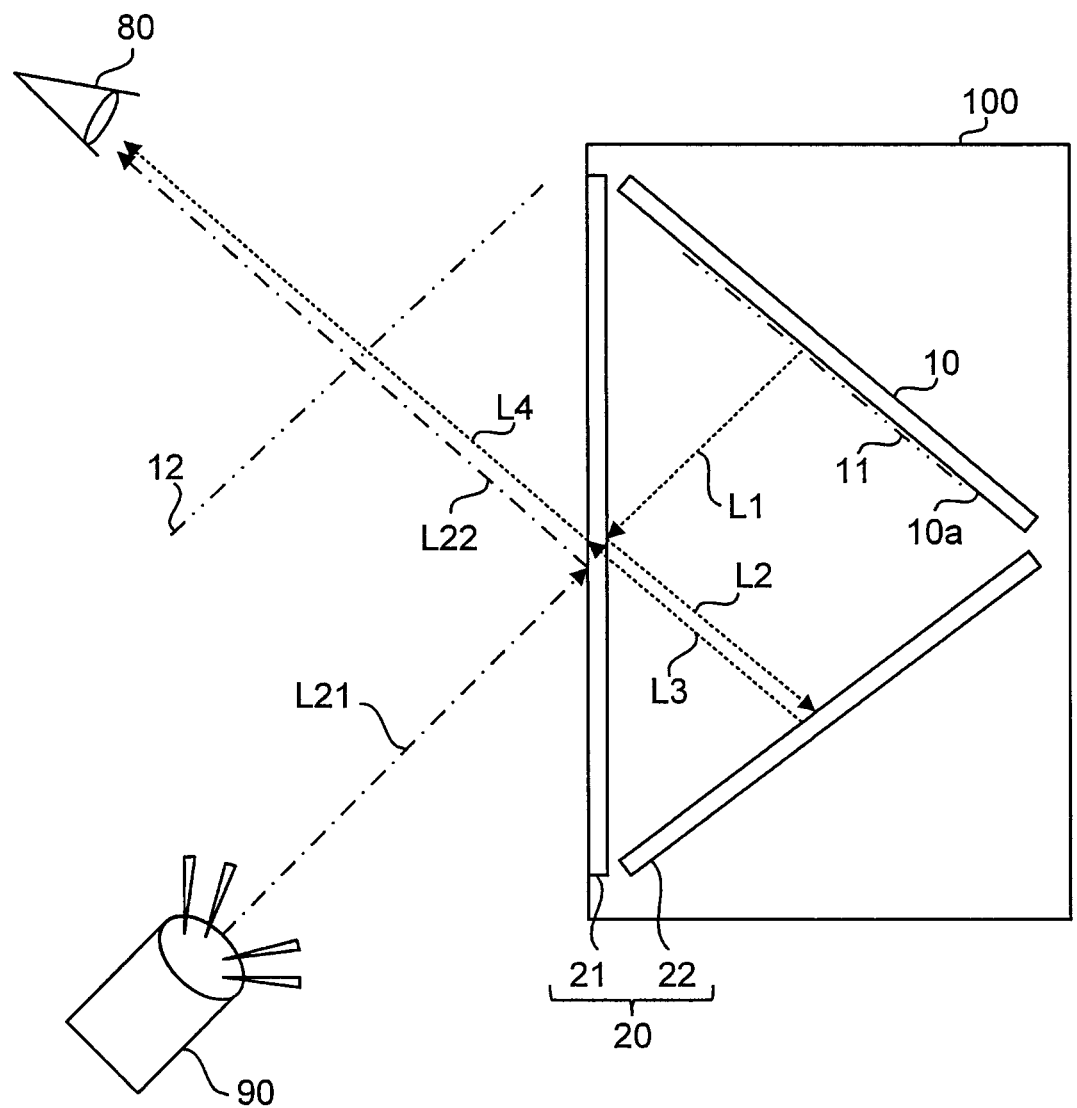
FIG. 4 is an explanatory diagram for explaining an example of a factor of deterioration in image quality of a floating image shown in FIG. 2.

Next, a factor of the deterioration in the image quality of the floating image 12 due to the influence of the ambient light L21 will be described below by using FIGS. 4 and 5. FIG. 4 is an explanatory diagram for explaining an example of the factor of the deterioration in the image quality of the floating image 12 shown in FIG. 2. The deterioration in the image quality of the floating image 12 occurs depending on a relationship between the beam splitter 21 and the ambient light L21. Therefore, the following description will be given of an example in which the image quality of the floating image 12 is deteriorated by reflection of the ambient light L21 by the beam splitter 21.

As mentioned earlier, the beam splitter 21 is an optical member that is arranged on the optical path for forming the floating image 12 and reflects or transmits the incident light. Therefore, the beam splitter 21 reflects part of the ambient light L21 emitted from the ambient light source 90 and emits the reflected light as light L22 heading for the eyes 80 of the observer. When the light L22 as the light included in the ambient light L21 and reflected by the ambient light L21 travels on the optical path of the fourth light L4 forming the floating image 12, the luminance of the fourth light L4 is augmented by the luminance of the light L22.

Here, the luminance at a position x of a pixel of the floating image 12 is assumed to be A(x), and the luminance at a position x of a display pixel as a pixel on the image display unit 10 is assumed to be L(x). Further, the transmittance of the beam splitter 21 is assumed to be T, the reflectance of the beam splitter 21 is assumed to be R, and an attenuation rate of the fourth light L4 in the space is assumed to be α. In this case, the luminance A(x) is represented by the following expression (1):

$$A(x) = L(x) \cdot T \cdot R \cdot \alpha. \tag{1}$$

The transmittance T, the reflectance R and the attenuation rate α are decimals in a range from 0 to 1. The attenuation rate α decreases with the increase in an optical path distance as the distance from the position x of the display pixel to the position where the floating image 12 is formed, and the attenuation rate α increases with the decrease in the optical path distance. Further, the attenuation rate α includes an attenuation rate of peak luminance based on the reflection accuracy of the retroreflective sheet 22. Therefore, the attenuation rate α varies depending on the incidence angle of the light upon a retroreflective element (not shown) included in the retroreflective sheet 22.

Furthermore, let $B_1(x)$ represent the luminance at the position x of the pixel of the floating image 12 through which the light L22 passes and Le(x) represent the luminance of the ambient light L21 incident upon the beam splitter 21, the luminance $B_1(x)$ is represented by the following expression (2):

$$B_1(x) = Le(x) \cdot R. \tag{2}$$

A condition for the occurrence of the luminance Le(x) is a positional relationship in which a relationship among the position of the reflecting surface of the beam splitter 21, the position of the ambient light source 90 and the position of the observer is in regular reflection directions.

By the augmentation of the luminance A(x) by the luminance $B_1(x)$, a region locally having high luminance occurs in the floating image 12. In this case, the observer recognizes blown out highlights or the like, and thus loss of visual information occurs in the floating image 12. Further, in general, from the viewpoint of the observer's visual properties, when light with high intensity passes through the floating image 12, the contrast relatively deteriorates also at pixels in a vicinal region in the vicinity of the region through which the light passes. Therefore, the luminance, the contrast, the resolution and so forth deteriorate also in a vicinal region in the vicinity of the position x of the pixel of the floating image 12 through which the light L22 passes. Such deterioration in the image quality is in proportion to the distance between the pixel through which the light L22 passes and the pixel in the vicinity. Therefore, the image quality deterioration region information 64 may include mapping information indicating the image quality deterioration at the pixels in the vicinity of the position x of the pixel through which the light L22 passes. Accordingly, the deterioration in the image quality of the floating image 12 can be prevented.

In a case where the image quality deterioration region information 64 is mapping information indicating the deterioration level of the chromaticity, the mapping information indicates difference data between the chromaticity of a pixel before the light L22 passes through the floating image 12 and the chromaticity of the pixel when the light L22 passes through the floating image 12. The chromaticity of the pixel when the light L22 passes through the floating image 12 is obtained by adding the chromaticity of the ambient light L21 outputted from the ambient light information acquisition unit 52 to the chromaticity of the pixel before the light L22 passes through the floating image 12 based on the ratio between the luminance A(x) and the luminance $B_1(x)$.

Next, another factor of the deterioration in the image quality of the floating image 12 due to the influence of the ambient light L21 will be described below by using FIG. 5. FIG. 5 is an explanatory diagram for explaining another example of the factor of the deterioration in the image quality of the floating image 12 shown in FIG. 2. The deterioration in the image quality of the floating image 12 occurs also depending on a relationship between the performance of the retroreflective elements of the retroreflective sheet 22 and the ambient light L21.

Depending on the shape of the retroreflective element forming the retroreflective sheet 22, there are cases where the light incident upon the surface 22a of the retroreflective sheet 22 is reflected towards a direction different from the ideal retroreflection direction. In the case of the retroreflective sheet 22 of the prism type, the reflection direction is determined by, for example, setting the number of times of reflection to be smaller than or equal to a predetermined number of times. For example, when the retroreflective element is a microprism, ideal retroreflection, namely, reflection of the incident light towards the incidence direction, is realized by setting the number of times of reflection of light at three times or less. However, depending on the magnitude of the incidence angle or the shape of the retroreflective element, there is a possibility that the incident light is reflected towards a direction different from the incidence direction (namely, the ideal retroreflection direction) even when the number of times of reflection is three times or less.

Further, the reflection direction at the surface 22a of the retroreflective sheet 22 is a reflection direction of specular reflection by a protective layer provided on the surface of the retroreflective element. There are cases where a protective film formed of organic material has been added to the surface of the retroreflective element. In such cases, the incident light undergoes specular reflection by the protective film. In other words, the surface 22a of the retroreflective sheet 22 serves as a mirror surface, by which reflected light is formed. Therefore, when light L23 included in the ambient light L21 and passing through the beam splitter 21 arrives at the retroreflective sheet 22, the light L23 undergoes specular reflection by the retroreflective sheet 22 and is incident upon the beam splitter 21 again as light L24. Part of the light L24 incident upon the beam splitter 21 heads for the eyes 80 of the observer as light L25. When the light L25 heads for the eyes 80 of the observer while traveling in the optical path of the fourth light L4 forming the floating image 12, the image quality at the position x in the floating image 12 through which the light L25 passed deteriorates.

Figure 5:
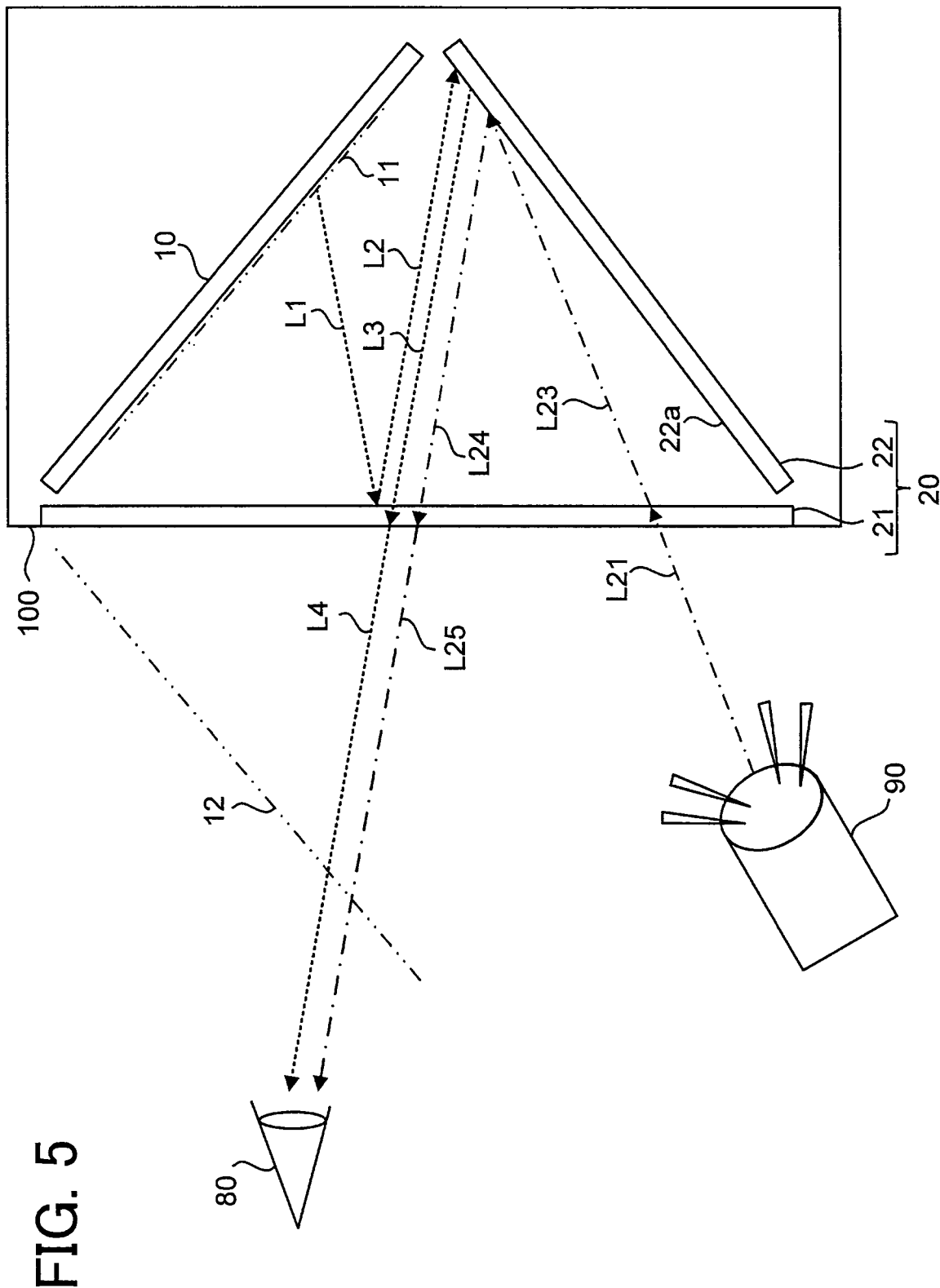
FIG. 5 is an explanatory diagram for explaining another example of the factor of the deterioration in the image quality of the floating image shown in FIG. 2.

In the example shown in FIG. 5, the luminance A(x) at the pixel at the position x in the floating image 12 before the passage of the light L25 is represented by the aforementioned expression (1). The luminance at the pixel at the position x in the floating image 12 at the time of the passage of the light L25 is assumed to be $B_2(x)$, and the luminance of the ambient light L21 when being incident upon the beam splitter 21 is assumed to be $Le(x)$. Further, let $\beta$ represent the attenuation rate of light at the retroreflective sheet 22 and T represent the transmittance of the beam splitter 21, the luminance $B_2(x)$ is represented by the following expression (3):

$$B_2(x) = Le(x) \cdot T^2 \cdot \beta. \tag{3}$$

As shown in the expression (3), the luminance B2(x) is proportional to the square of the transmittance T of the beam splitter 21. This is because the ambient light L21 and the light L24 pass through the beam splitter 21 in the example shown in FIG. 5. That is, this is because light passes through the beam splitter 21 twice. In the case where the retroreflective sheet 22 includes the retroreflective elements, the attenuation rate $\beta$ is at a value obtained by subtracting an internal scattering component and a surface attenuation component from the attenuation rate of the retroreflected light with respect to the incident light. Further, in cases where the retroreflective sheet 22 has a specular reflection layer as a surface protection material, the attenuation rate $\beta$ equals reflectance based on optical specifications of the surface protection material.

The image quality deterioration region estimation unit 54 executes a mapping process of calculating the image quality deterioration region information 64 based on the ratio between the luminance A(x) and the luminance $B_2(x)$. This mapping process is the same as the mapping process explained earlier by using FIG. 4, and thus explanation thereof is omitted here.

The deterioration in the image quality of the floating image 12 occurs also depending on a relationship among light reflectiveness and light permeability of the beam splitter 21 and the ambient light L21.

Multiple reflection and scattering of light can occur at the beam splitter 21 depending on surface treatment or internal element structure. For example, in cases where the beam splitter 21 has undergone the so-called non-glare surface treatment, the ambient light L21 incident upon the beam splitter 21 is scattered and that can make the observer visually recognize that the surface of the beam splitter 21 is shining. Further, in cases where the beam splitter 21 has a reflecting surface that reflects the first light L1 and a reflecting surface that reflects part of the ambient light L21, there occur optical phenomena such as multiple reflection of the ambient light L21 inside the beam splitter 21 and refraction of the ambient light L21 when passing through the beam splitter 21. Upon the occurrence of such optical phenomena, there is a danger that the observer visually recognizes that the surface of the beam splitter 21 is shining like diffuse light.

When the multiple reflection and the refraction of light occur at the beam splitter 21 as above, the luminance of the floating image 12 is augmented needlessly. Accordingly, the image quality of the floating image 12 deteriorates. Therefore, information indicating occurrence probability of scattered light at the beam splitter 21 may be previously stored as the optical system specification information 62a to be used for the estimation of the image quality deterioration region. In this case, the image quality deterioration region estimation unit 54 is capable of calculating the luminance $B_1(x)$ by correcting the reflectance R in the expression (2).

The deterioration in the image quality of the floating image 12 occurs also depending on a relationship between light reflectiveness of the retroreflective sheet 22 and the ambient light L21.

Depending on the light reflectiveness of the retroreflective sheet 22, there are cases where the ambient light L21 incident upon the surface 22a of the retroreflective sheet 22 is reflected towards a direction different from the ideal retroreflection direction. Thus, there are cases where light included in the ambient light L21 and reflected by the retroreflective sheet 22 travels on the optical path of the fourth light L4 forming the floating image 12. In this case, the luminance of the floating image 12 is augmented needlessly. Accordingly, the image quality of the floating image 12 deteriorates. Therefore, information indicating the reflection accuracy of the retroreflective sheet 22 may be previously stored as the optical system specification information 62a to be used for the estimation of the image quality deterioration region. Here, the reflection accuracy of the retroreflective sheet 22 is represented by data such as lighting distribution characteristics in which the reflection direction at peak luminance of the reflected light reflected by the retroreflective sheet 22 is specified as the angular origin.

In the examples shown in FIGS. 4 and 5, the retroreflective sheet 22 is placed in the direction of the observer's line of sight pointed towards the floating image 12. Therefore, suppose that the ambient light source exists to the rear of the observer, the ambient light emitted from the ambient light source passes through the beam splitter 21 and can thereafter be reflected by the retroreflective sheet 22 towards a direction different from the ideal retroreflection direction, pass through the beam splitter 21 again, and arrive at the eyes of the observer. The luminance of the floating image 12 when the ambient light traveling in such an optical path passes through the floating image 12 is represented by the aforementioned expression (3), for example. The attenuation rate $\beta$ in the expression (3) varies depending on the optical system specification information 62a on the retroreflective sheet 22. The attenuation rate $\beta$ is a value obtained by calculation using the lighting distribution characteristics of the retroreflective sheet 22 in the reflection direction based on the position information on the observer and the ambient light source.

The factor of the deterioration in the image quality of the floating image 12 estimated by the image quality deterioration region estimation unit 54 occurs also depending on a positional relationship among the image display unit 10, the beam splitter 21, the retroreflective sheet 22 and the ambient light source 90.

When the ambient light L21 that passes through the beam splitter 21 is retroreflected by the retroreflective sheet 22 and is incident upon the beam splitter 21 again, there are cases where the light is reflected by the beam splitter 21. In such cases, the light reflected by the beam splitter 21 can be visually recognized by the observer by being reflected by the display surface 10a of the image display unit 10 and thereafter traveling in the optical path of the image forming the floating image 12.

Here, the luminance of the floating image 12 at the pixel at the position x when the ambient light L21 after passing through the beam splitter 21 and undergoing reflection by the retroreflective sheet 22, the beam splitter 21 and the image display unit 10 in this order passes through the floating image 12 is assumed to be $B_3(x)$. Further, the luminance of the ambient light L21 when being incident upon the beam splitter 21 is assumed to be Le(x), the transmittance of the beam splitter 21 is assumed to be T, the attenuation rate of light at the retroreflective sheet 22 is assumed to be β, and the reflectance of light at the image display unit 10 is assumed to be γ. In this case, the luminance $B_3(x)$ is represented by the following expression (4):

$$B_3(x) = Le(x) \cdot T^2 \cdot R^2 \cdot \beta \cdot Y. \qquad (4)$$

The reflectance γ represents the reflectance of light at the display surface 10a of the image display unit 10. The reflectance γ is, for example, diffuse light reflectance or the like at the display surface of an LCD (Liquid Crystal Display) that has undergone the non-glare surface treatment.

Further, as the floating image formation optical system 20 of the floating image display device 100 according to the first embodiment, there exists an image formation system including a dihedral corner reflector and a microlens array. In the case of the image formation system, the image quality deterioration region estimation unit 54 is capable of calculating the luminance of the floating image 12 before and after the passage of the ambient light L21 based on optical element information indicating luminance efficiency of light included in the ambient light L21 and traveling in the floating image formation optical path or distribution of light included in the ambient light L21 and not undergoing the floating image formation as stray light. The luminance efficiency and the optical element information are obtained by, for example, consolidating the transmittance T and the reflectance R of the beam splitter 21, the attenuation rate β of the retroreflective sheet 22, and so forth described above.

Figure 6A:
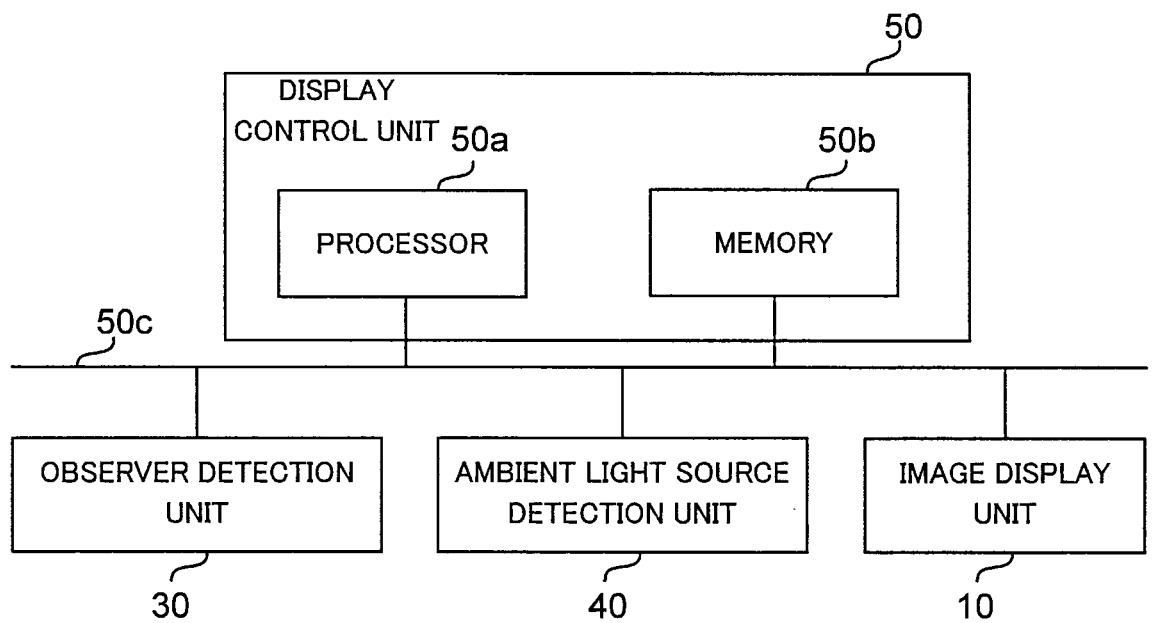
FIG. 6A is a diagram schematically showing an example of the hardware configuration of the floating image display device according to the first embodiment.

Next, the hardware configuration of the floating image display device 100 will be described below. FIG. 6A is a diagram schematically showing the hardware configuration of the floating image display device 100. As shown in FIG. 6A, the display control unit 50 of the floating image display device 100 can be implemented by using a memory 50b as a storage device that stores a program as software and a processor 50a as an information processing unit that executes the program stored in the memory 50b, for example (e.g., by a computer). It is also possible to implement part of the display control unit 50 by the memory 50b shown in FIG. 6A and the processor 50a executing a program. Further, the display control unit 50 may also be implemented by an electric circuit.

The image display unit 10, the observer detection unit 30 and the ambient light source detection unit 40 are connected to the processor 50a via a bus 50c.

Figure 6B:
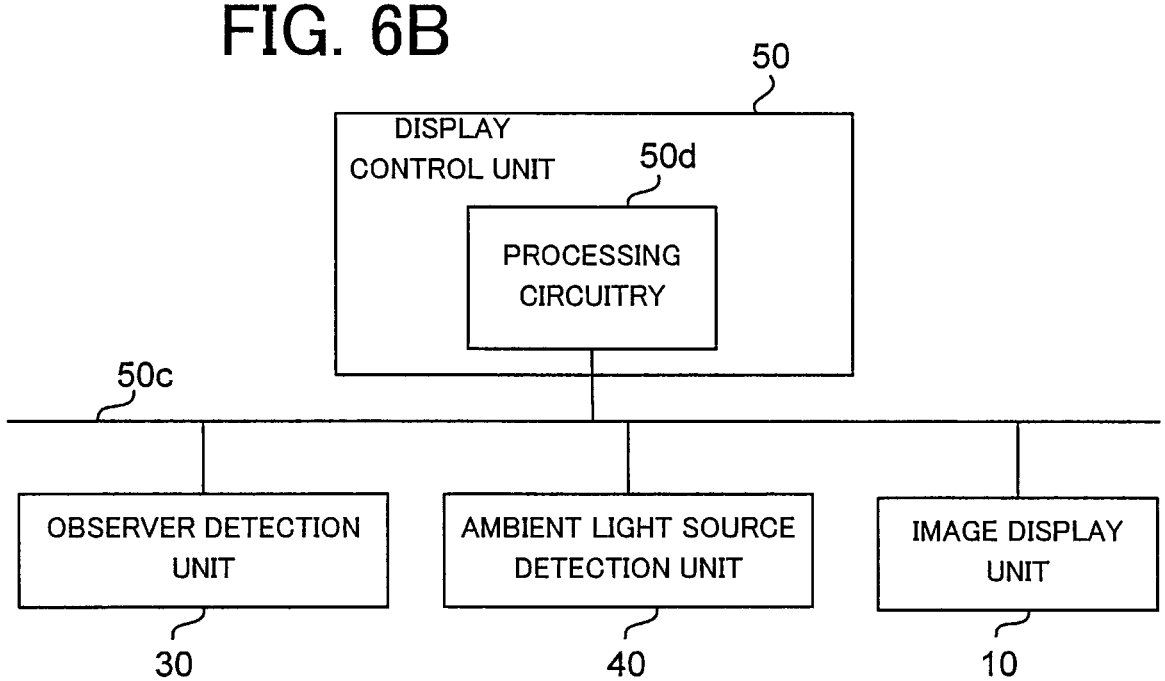
FIG. 6B is a diagram schematically showing another example of the hardware configuration of the floating image display device according to the first embodiment.

FIG. 6B is a diagram schematically showing another example of the hardware configuration of the floating image display device 100. As shown in FIG. 6B, the display control unit 50 may also be implemented by using processing circuitry 50d as dedicated hardware such as a single circuit or a combined circuit. In this case, the functions of the display control unit 50 are implemented by the processing circuitry 50d.

<Correction of Image>

Next, a description will be given of the correction of the image on the image display unit 10 by the floating image display processing unit 55. The floating image display processing unit 55 controls the display image information 65 (see FIG. 1) outputted to the image display unit 10 based on the image quality deterioration region estimated by the image quality deterioration region estimation unit 54. The contents of the control by the floating image display processing unit 55 are, for example, correction of the image quality of the image 11 or layout of the image 11.

Figure 7A:
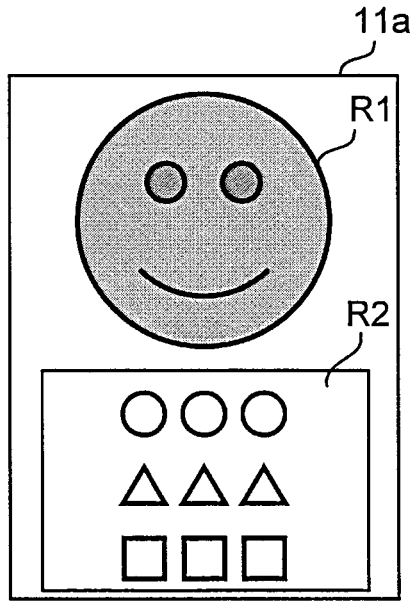
FIGS. 7A to 7D are diagrams showing an example of image quality correction control executed by a floating image display processing unit shown in FIG. 1.

FIGS. 7A to 7D are explanatory diagrams for explaining an example of image quality correction control executed by the floating image display processing unit 55. FIG. 7A is a diagram showing an example of an image 11a based on the display image information 65 (see FIG. 1). The image 11a includes an illustration region R1 and a character region R2, for example.

Figure 7B:
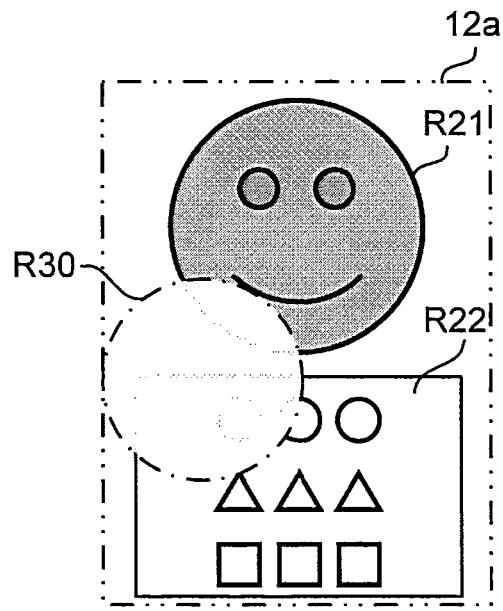

FIG. 7B is a diagram showing an example of a floating image 12a formed by the light of the image 11a, to which the ambient light has been added. The floating image 12a includes a floating illustration region R21 corresponding to the illustration region R1 (see FIG. 7A) and a floating character region R22 corresponding to the character region R2 (see FIG. 7A). When the light L22, L25 (see FIGS. 4 and 5) is added to the floating image 12a, the luminance of an ambient light passage region R30, as the region through which the light L22, L25 passes, in the floating image 12a is augmented compared to the luminance of the floating illustration region R21 and the floating character region R22 being vicinal regions. As above, in the floating image 12a, there exists a region locally having high luminance. In this case, the contrast of the floating image 12a deteriorates, and thus the observer's visibility deteriorates.

Figure 7C:
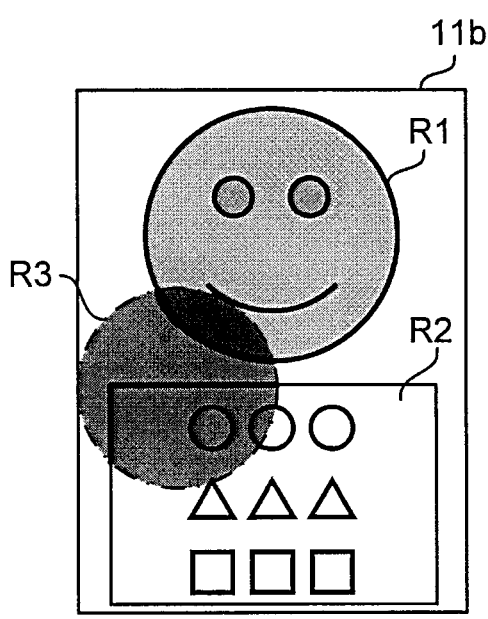

FIG. 7C is a diagram showing an example of an image 11b based on the output image information 66 (see FIG. 1). The image 11b includes the image quality deterioration region R3 as a region corresponding to the ambient light passage region R30 shown in FIG. 7B. The floating image display processing unit 55 (see FIG. 1) corrects the luminance of the image quality deterioration region R3 so that the luminance of the ambient light passage region R30 approaches the luminance of the vicinal region in the vicinity of the ambient light passage region R30. In the example shown in FIG. 7C, the luminance of the image quality deterioration region R3 is lower than the luminance of each of the illustration region R1 and the character region R2.

The floating image display processing unit 55 may correct the contrast of the image quality deterioration region R3 so that the contrast of the ambient light passage region R30 approaches the contrast of the vicinal region in the vicinity of the ambient light passage region R30. Further, the floating image display processing unit 55 may correct the grayscale value of the image quality deterioration region R3 so that the grayscale value of the ambient light passage region R30 approaches the grayscale value of the vicinal region in the vicinity of the ambient light passage region R30. As above, the floating image display processing unit 55 may correct at least one of the luminance, the contrast and the grayscale value of the image 11 based on the image quality deterioration region R3.

Figure 7D:
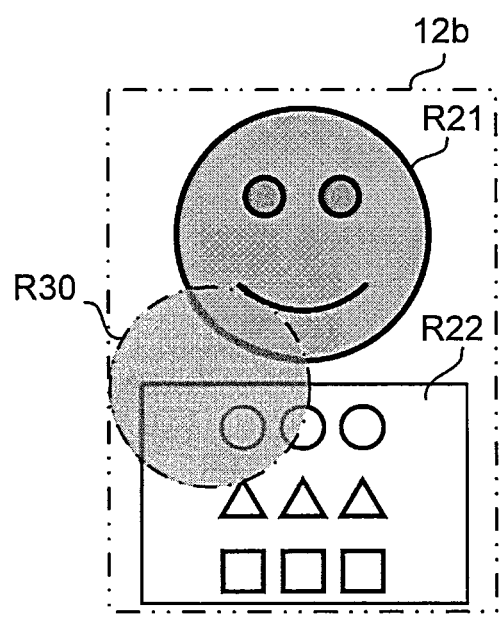

FIG. 7D is a diagram showing an example of a floating image 12b formed by the light of the image 11b, to which the ambient light has been added. When the floating image 12b is displayed, the luminance of the ambient light passage region R30 is approximately the same as the luminance of each of the floating illustration region R21 and the floating character region R22. Accordingly, the occurrence of the region locally having high luminance can be prevented even when the light L22, L25 included in the ambient light L21 and reflected by the floating image formation optical system 20 passes through the floating image 12b. Thus, annoyance given to the vision of the observer can be reduced and unevenness of recognition of visual information by the observer can be reduced.

As above, the correction of the image 11 by the floating image display processing unit 55 is a process of correcting the luminance of each pixel in the image quality deterioration region R3 corresponding to the ambient light passage region R30, for example. The floating image display processing unit 55 extracts an increment in the luminance (hereinafter referred to also as "grayscale luminance") at each pixel in the ambient light passage region R30 based on the image quality deterioration region information 64 generated by the image quality deterioration region estimation unit 54. Then, the floating image display processing unit 55 decreases the grayscale luminance of each pixel in the image quality deterioration region R3 by the same amount as the extracted increment. By this, the output image information 66 for correcting the grayscale luminance is generated, and the image 11*b* based on the output image information 66 is displayed on the image display unit 10.

Further, the image 11 correction process executed by the floating image display processing unit 55 is a process of increasing the contrast of each pixel in the image quality deterioration region R3 corresponding to the ambient light passage region R30, for example. The floating image display processing unit 55 mitigates the deterioration in the contrast of the floating image 12 due to the influence of the ambient light L21 based on a statistic of the luminance (hereinafter referred to also as "luminance histogram") of the image quality deterioration region R3.

First, based on the luminance histogram, the floating image display processing unit 55 calculates the ratio between maximum luminance and minimum luminance in the image quality deterioration region R3 as the contrast. Then, the floating image display processing unit 55 executes a process of converting the grayscale values so that the calculated contrast becomes equal to contrast in another region in the floating image 12 which is not influenced by the ambient light L21.

Here, the grayscale value after the correction is assumed to be g, and the grayscale value before the correction is assumed to be f. Further, let Fmax represent the maximum luminance in the image quality deterioration region R3 as the target of the contrast correction process, Fmin represent the minimum luminance in the image quality deterioration region R3, and G represent a correction function, the grayscale value g is represented by the following expression (5):

$$g = G \cdot (f - F\min)/(F\max - F\min). \quad (5)$$

The correction function G is a function for converting the grayscale value g to a target contrast, and includes an argument as a value obtained by normalizing the luminance histogram of the grayscale value f. The correction function G is a linear function, for example. In this case, the correction function G uses a maximum grayscale value and a minimum grayscale value as arguments (input parameters) and calculates a contrast that is linearly proportional to the arguments. The correction function G can also be a nonlinear function. In this case, the correction function G uses the maximum grayscale value and the minimum grayscale value as the arguments (input parameters) and executes a grayscale value conversion process using the gamma characteristic based on the arguments. By this, the floating image display processing unit 55 is capable of calculating the change amount of the grayscale value in consideration of an electricity-light transduction property of the image display unit 10.

Further, the correction function G can also be a function for locally changing the grayscale value, for example. In this case, the correction function G is capable of preventing the deterioration in the observer's visibility in regard to the floating image 12 by increasing or decreasing the luminance of the edge of the image or the luminance emphasizing the visual information. In such a control process using the correction function G, besides performing numerical calculation on the inputted grayscale value, it is also possible to implement the grayscale value conversion by an LUT and thereby realize easy parameter adjustment and speeding up of the process.

The image 11 correction process executed by the floating image display processing unit 55 is a process of controlling the edge of the image 11, for example. A display object such as a geometrical shape or a character produces a strong visual effect. Therefore, when the contrast of the floating image 12 deteriorates due to the influence of the ambient light, the deterioration in the observer's visibility can be prevented by performing an edge emphasis process on the display object in the image 11.

For example, the edge emphasis process estimates an edge direction in the image quality deterioration region R3 and makes a correction of setting a luminance ratio between the grayscale value at the edge and the grayscale value in a region in the vicinity of the edge to be higher than a predetermined threshold value. For the estimation of the edge direction, a filter function for extracting the feature of a vicinal pixel grayscale region made up of a plurality of pixels (e.g., 3×3 pixels or 5×5 pixels) in the image quality deterioration region R3 is used, for example. In the edge emphasis process, it is also possible, for example, to make a correction of increasing the contrast of a grayscale region being a high-frequency component by calculating the frequency characteristic of the grayscale value in the image quality deterioration region R3.

Further, the edge emphasis process can also be a process of reducing the edge in a region in the image 11 different from the image quality deterioration region R3. Accordingly, the observer's attention is directed to the ambient light passage region R30 in the floating image 12, and thus it is possible to make the observer recognize the ambient light passage region R30. Here, the method of reducing the edge can be implemented by, for example, a method of reducing the contrast of a smoothing filter or the like in regard to a region having a high frequency characteristic of the grayscale value in a region different from the region corresponding to the image quality deterioration region R3.

For the edge emphasis process of the region corresponding to the image quality deterioration region R3 and the edge reduction process of the region different from the aforementioned region, it is also possible to make a judgment on the presence/absence of the process or make an adjustment of parameter intensity based on the contents of the display image information 65, importance of the visual information in the image quality deterioration region R3, or the like.

While control examples of the luminance, the contrast and the edge correction have been described above independently of each other, these control processes may also be executed in cooperation with each other depending on the contents of the floating image to be visually recognized by the observer. For example, since factors improving the observer's visibility are brightness and sharpness of the image, the levels of importance of the brightness and the sharpness vary depending on the display content. When text content is included in the image 11, the sharpness of the image 11 is important in order to improve readability. In contrast, when simple content such as an illustration or an icon or content with various colors is included in the image 11, the brightness of the image 11 is important in order to visually augment stimulation.

Further, when content with various colors is included in the image 11, it is important to execute the correction process in consideration of the chromaticity (light emission color). Here, in the correction process employing the chromaticity, the correction process in consideration of the chromaticity can be executed by, for example, converting the grayscale values to chromaticity parameters in the HSV color space and correcting the luminance corresponding to each chromaticity parameter included in a range of a predetermined threshold value among the chromaticity parameters. Furthermore, the floating image display processing unit 55 may change light directivity distribution indicating a viewing angle on the image display unit 10, based on the image quality deterioration region R3. As above, the floating image display processing unit 55 may change at least one of the intensity, the light directivity distribution and the chromaticity of the image light based on the image quality deterioration region R3.

Next, another example of the correction of the image on the image display unit 10 by the floating image display processing unit 55 will be described below. FIGS. 8A to 8D are explanatory diagrams for explaining an example of layout control of the image executed by the floating image display processing unit 55. In the example shown in FIGS. 8A to 8D, the floating image display processing unit 55 corrects the size and the arrangement of each display object included in the image on the image display unit 10 based on the image quality deterioration region R3 estimated by the image quality deterioration region estimation unit 54.

Figure 8A:
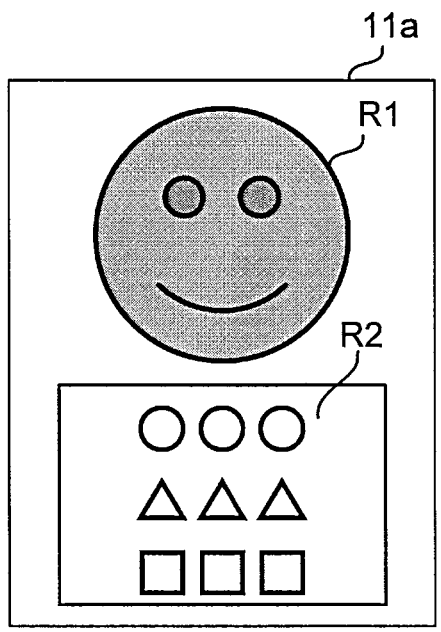
FIGS. 8A to 8D are diagrams showing an example of layout control executed by the floating image display processing unit shown in FIG. 1.

FIG. 8A is a diagram showing an example of the image 11a based on the display image information 65 before the correction. The display objects of the image 11a include the illustration region R1 and the character region R2.

Figure 8B:
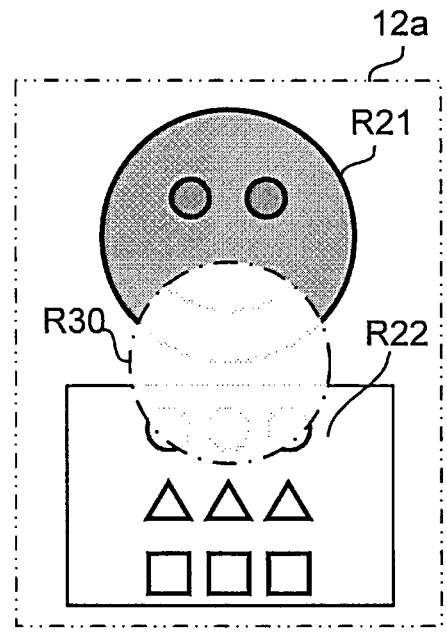

FIG. 8B is a diagram showing an example of the floating image 12a formed by the light of the image 11a, to which the ambient light has been added. The floating image 12a includes the floating illustration region R21 corresponding to the illustration region R1 (see FIG. 8A) and the floating character region R22 corresponding to the character region R2 (see FIG. 8A). When the light L22, L25 (see FIGS. 4 and 5) is added to the floating image 12a, the luminance of the ambient light passage region R30, as the region through which the light L22, L25 passes, in the floating image 12a is augmented compared to the luminance of the floating illustration region R21 and the floating character region R22 being vicinal regions. As above, in the floating image 12a, there exists a region locally having high luminance. In this case, the contrast of the floating image 12a deteriorates, and thus the observer's visibility deteriorates.

Figure 8C:
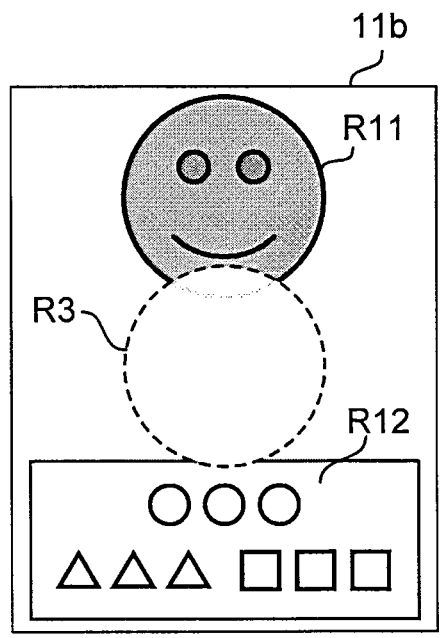

FIG. 8C is a diagram showing an example of the image 11b based on the output image information 66 after the correction. The floating image display processing unit 55 corrects the size and the arrangement of the illustration region R1 so that the illustration region R1 (see FIG. 8A) does not overlap with the image quality deterioration region R3. Specifically, the arrangement position of an illustration region R11 after the correction differs from the arrangement position of the illustration region R1 before the correction. Further, the size of the illustration region R11 after the correction is smaller than the size of the illustration region R1 before the correction.

Further, the floating image display processing unit 55 corrects the arrangement of the character region R2 so that the character region R2 (see FIG. 8A) does not overlap with the image quality deterioration region R3. Specifically, the arrangement position of a character region R12 after the correction differs from the arrangement position of the character region R2 before the correction. As above, the floating image display processing unit 55 generates the output image information 66 that controls the size and the arrangement of the illustration region R1 and the arrangement of the character region R2 and outputs the output image information 66 to the image display unit 10. Accordingly, the image 11b including the illustration region R11 and the character region R12 after the correction as the display objects is displayed on the image display unit 10.

Figure 8D:
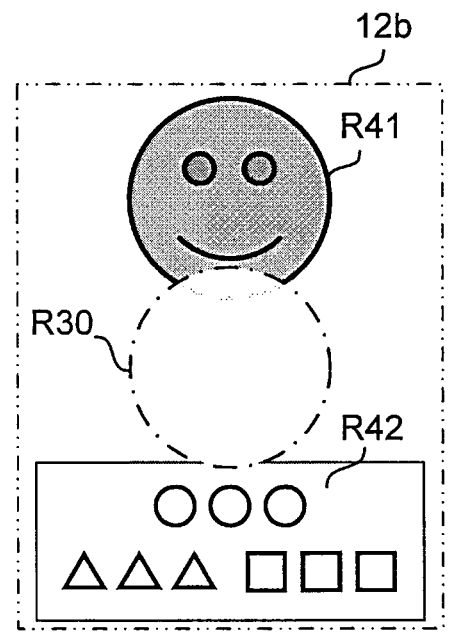

FIG. 8D is a diagram showing an example of the floating image 12b formed by the light of the image 11b, to which the ambient light has been added. The floating image 12b includes a floating illustration region R41 after the correction corresponding to the illustration region R11 (see FIG. 8C) and a floating character region R42 after the correction corresponding to the character region R12 (see FIG. 8C).

When the floating image 12b is displayed, the range where the floating illustration region R41 overlaps with the ambient light passage region R30 is smaller than the range where the floating illustration region R21 overlaps with the ambient light passage region R30 shown in FIG. 8B. By this, the deterioration in the observer's visibility in regard to the floating illustration region R41 can be prevented. Further, when the floating image 12b is displayed, the floating character region R42 does not overlap with the ambient light passage region R30. By this, the deterioration in the observer's visibility in regard to the floating character region R42 can be prevented.

Before correcting the sizes and the arrangement of the display objects included in the image 11a, the floating image display processing unit 55 may judge propriety of the correction based on levels of importance of the display objects to be visually recognized by the observer. For example, when a plurality of display objects are combined in the display image information 65, the levels of importance of the display objects are priority orders or the like of the plurality of display objects. When the priority orders have been set to the display objects, the floating image display processing unit 55 sets the arrangement position of a display object with a high priority order at a position not overlapping with the image quality deterioration region R3 and sets the size of the display object at a large size, for example. Further, the floating image display processing unit 55 may execute a process of reducing the size of a display object with a low priority order, thereby making the display permissible even if the display object is arranged at a position overlapping with the image quality deterioration region R3.

Before correcting the sizes and the arrangement of the display objects included in the image 11a, the floating image display processing unit 55 may judge the propriety of the correction based on an arrangement relationship of the display objects to be visually recognized by the observer. The arrangement relationship of the display objects to be visually recognized by the observer means, for example, a case where the display image information 65 includes a plurality of display objects differing in appearance such as an illustration and a character, a relevance between/among the plurality of display objects is high, and the plurality of display objects have a relationship of being arranged in the vicinity of each other. In this case, restriction arises in regard to the arrangement of the plurality of display objects, and thus the floating image display processing unit 55 corrects the arrangement of the display objects in consideration of the restriction. Further, the arrangement relationship of the display objects can mean a situation where the display image information 65 includes a plurality of display objects having high relevance to each other and a display object with low priority in regard to making the observer recognize the display object, among the plurality of display objects, is arranged in the image quality deterioration region R3.

Before correcting the sizes and the arrangement of the display objects included in the image 11a, the floating image display processing unit 55 may judge the propriety of the correction based on a cognitive resolution of the image information to be visually recognized by the observer. For example, when a floating image 12 including a character region is displayed, restriction can arise in the size of the character region depending on the observer's condition. In this case, the floating image display processing unit 55 corrects the display image information 65 based on a resolution corresponding to the size of the character region. Here, the size of the character region changes depending on the observer's physical difference. Thus, the observer's condition is the distance between the floating image 12 and the observer, the observer's visual acuity, or the like. For example, information indicating the observer's visual acuity includes at least one item of information out of information regarding whether or not the observer is hyperopic or myopic, information regarding whether or not the observer has a handicap such as dyschromatopsia, and information indicating an attribute of the observer such as an adult or a child.

<Operation of Floating Image Display Device>

Figure 9:
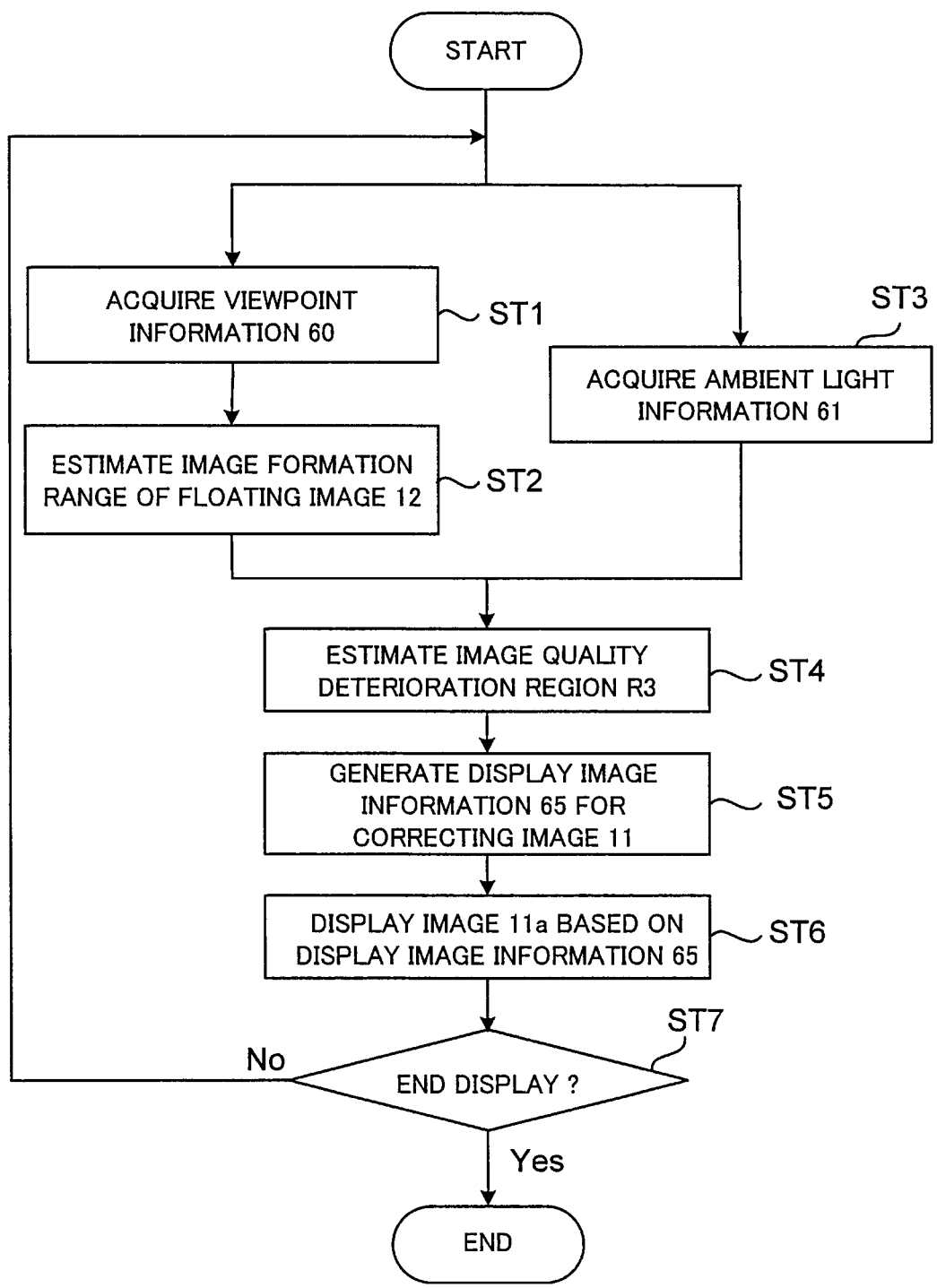
FIG. 9 is a flowchart showing the operation of the floating image display device according to the first embodiment.

Next, the operation of the floating image display device 100 according to the first embodiment will be described below. FIG. 9 is a flowchart showing the operation of the floating image display device 100 according to the first embodiment.

First, in step ST1, the viewpoint information acquisition unit 51 acquires the viewpoint information 60 indicating the position of the eyes 80 of the observer.

In step ST2, the floating image formation range estimation unit 53 estimates the image formation range of the floating image 12 based on the viewpoint information 60. Accordingly, the floating image 12 can be displayed in the direction of the observer's line of sight.

In step ST3, the ambient light information acquisition unit 52 acquires the ambient light information 61 indicating the position of the ambient light source 90 as the light source of the ambient light L21. The processing of the step ST3 is executed in parallel with the processing from the step ST1 to the step ST2, for example. The processing of the step ST3 may also be executed before or after the processing of the step ST1.

In step ST4, the image quality deterioration region estimation unit 54 estimates the image quality deterioration region R3 on the image display unit 10 based on the viewpoint information 60 and the ambient light information 61.

In step ST5, the floating image display processing unit 55 generates the output image information 66 for correcting the image 11 based on the image quality deterioration region R3.

In step ST6, the image display unit 10 displays the image 11a based on the output image information 66. Accordingly, the floating image 12 adapted to the position of the eyes 80 of the observer and the position of the ambient light source 90 is displayed.

In step ST7, the floating image display processing unit 55 judges whether or not the display of the floating image 12 should be ended, and ends the process when it is judged that the display of the floating image 12 should be ended (i.e., when the judgment is Yes in the step ST7). In contrast, when it is judged that the display of the floating image 12 should not be ended (i.e., when the judgment is No in the step ST7), the floating image display processing unit 55 repeats the processing from the step ST1 to the step ST6 until the display of the floating image 12 is ended.

As described above, the floating image display device 100 according to first embodiment estimates the image quality deterioration region R3 where the image quality of the floating image 12 is deteriorated based on the viewpoint information 60 on the observer, the ambient light information 61 and the floating image formation structure information 62. Further, the floating image display device 100 corrects the image 11 displayed on the image display unit 10 based on the estimated image quality deterioration region R3. Accordingly, the deterioration in the observer's visibility in regard to the floating image 12 can be prevented.

<Effect of First Embodiment>

As described above, with the floating image display device 100 according to the first embodiment, the image quality deterioration region R3 on the image display unit 10 is estimated based on the viewpoint information 60 and the ambient light information 61, and the image 11 is corrected based on the image quality deterioration region R3. Accordingly, the floating image 12 adapted to the position of the eyes 80 of the observer and the ambient light L21 can be displayed.

Further, with the floating image display device 100 according to the first embodiment, the floating image display processing unit 55 corrects at least one of the luminance, the contrast and the grayscale value of the image 11 based on the image quality deterioration region R3. Accordingly, the deterioration in the observer's visibility can be prevented even when the light L22, L25 included in the ambient light L21 and reflected by the floating image formation optical system 20 passes through the floating image 12.

Furthermore, with the floating image display device 100 according to the first embodiment, the floating image display processing unit 55 corrects at least one of the size and the layout of a display object included in the image 11 based on the image quality deterioration region R3. Accordingly, even when the light L22, L25 included in the ambient light L21 and reflected by the floating image formation optical system 20 passes through the floating image 12, the display object included in the image 11 can be displayed as the floating image 12 so as not to overlap with the image quality deterioration region R3.

Second Embodiment

Figure 10:
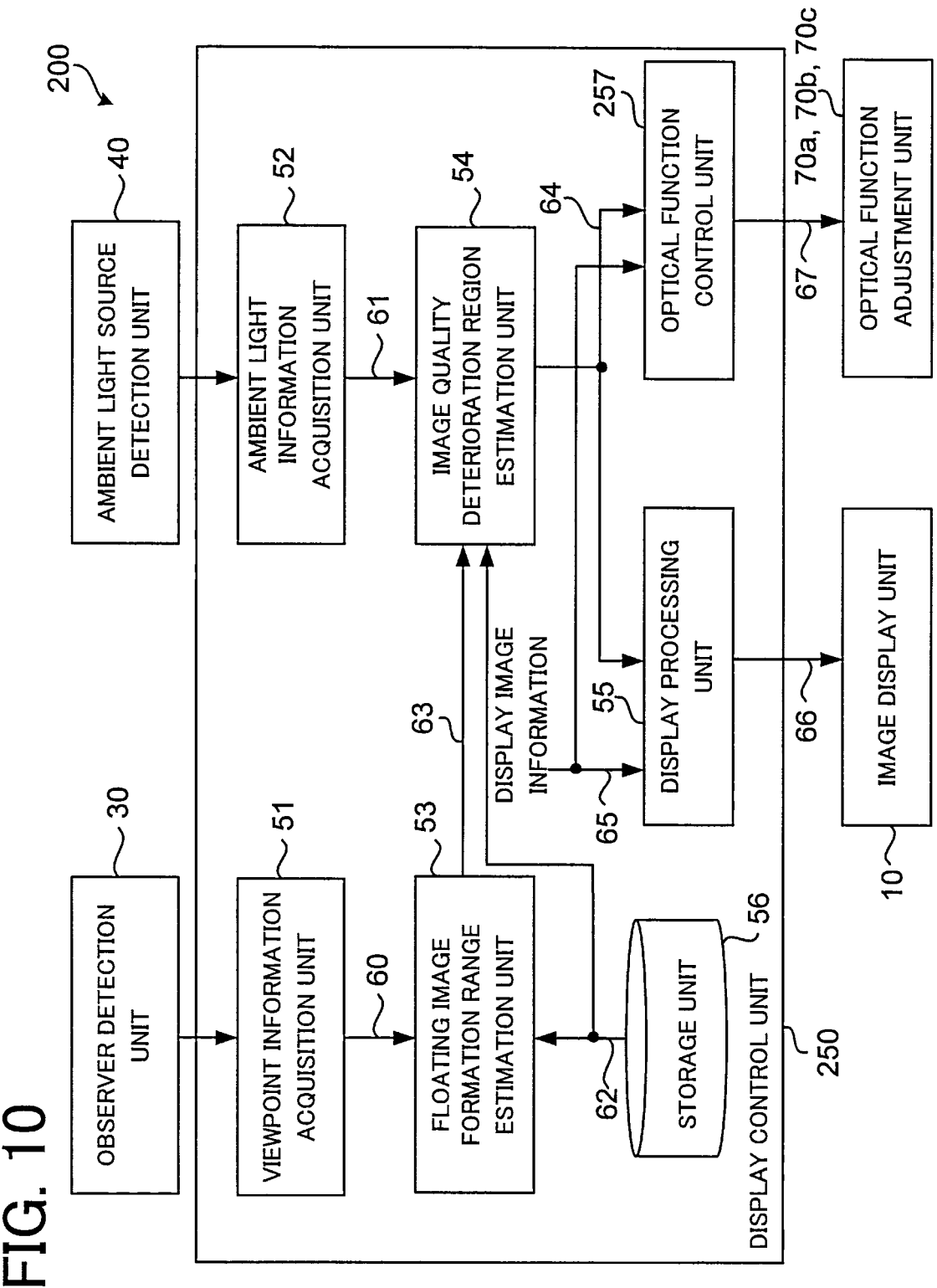
FIG. 10 is a block diagram for explaining the general configuration of a floating image display device according to a second embodiment.
Figure 11:
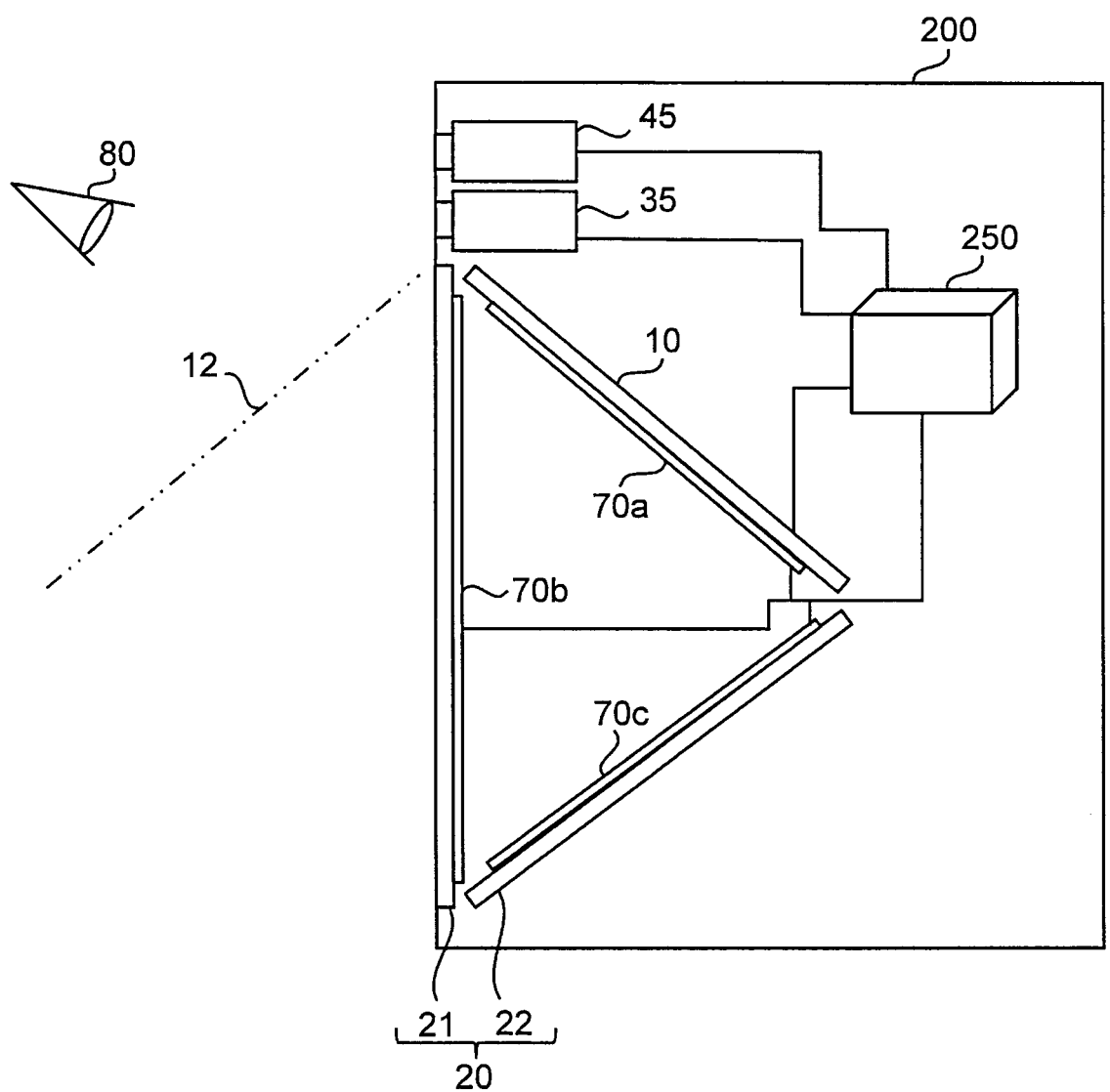
FIG. 11 is an explanatory diagram showing the configuration of the floating image display device according to the second embodiment.

FIG. 10 is a block diagram showing the configuration of a floating image display device 200 according to a second embodiment. FIG. 11 is an explanatory diagram for explaining the general configuration of the floating image display device 200 according to the second embodiment. In FIGS. 10 and 11, each component identical or corresponding to a component shown in FIG. 1 or 2 is assigned the same reference character as in FIG. 1 or 2. The floating image display device 200 according to the second embodiment differs from the floating image display device 100 according to the first embodiment in further including optical function adjustment units 70a, 70b and 70c and an optical function control unit 257. Except for these features, the floating image display device 200 according to the second embodiment is the same as the floating image display device 100 according to the first embodiment.

As shown in FIGS. 10 and 11, the floating image display device 200 includes the image display unit 10, the floating image formation optical system 20, the observer detection unit 30, the ambient light source detection unit 40, the optical function adjustment units 70a, 70b and 70c, and a display control unit 250.

The optical function adjustment units 70a, 70b and 70c are drive units that respectively drive the image display unit 10, the beam splitter 21 and the retroreflective sheet 22. The optical function adjustment units 70a, 70b and 70c are stepping motors, for example.

The display control unit 250 further includes the floating image formation range estimation unit 53, the image quality deterioration region estimation unit 54, the floating image display processing unit 55 and the optical function control unit 257.

The optical function control unit 257 controls the optical function adjustment units 70a, 70b and 70c based on the image quality deterioration region R3 (see FIG. 7C and FIG. 8C). Specifically, the optical function control unit 257 changes the positions of the image display unit 10, the beam splitter 21 and the retroreflective sheet 22 based on the display image information 65 and the image quality deterioration region information 64 so that the display object included in the image 11 does not overlap with the image quality deterioration region R3. In other words, in the second embodiment, a positional relationship between the image display unit 10 and the beam splitter 21 and a positional relationship between the image display unit 10 and the retroreflective sheet 22 can be changed depending on the position of the image quality deterioration region R3. Therefore, the deterioration in the observer's visibility can be prevented even when the light L22, L25 (see FIGS. 4 and 5) included in the ambient light L21 and reflected by the floating image formation optical system 20 passes through the floating image 12. It is permissible if the floating image display device 200 includes the drive unit for at least one of the image display unit 10 and the floating image formation optical system 20.

The optical function adjustment unit 70a can also be a backlight drive unit that drives the backlight light source included in the image display unit 10. In this case, the optical function adjustment unit 70a drives the backlight light source based on a signal 67 outputted from the optical function control unit 257. Specifically, the optical function control unit 257 changes the luminance of the image quality deterioration region R3 by changing the light amount of the backlight light source so that the luminance of the ambient light passage region R30 approaches the luminance of the vicinal region in the vicinity of the ambient light passage region R30. Accordingly, the deterioration in the visibility of the observer visually recognizing the floating image 12 can be prevented even when the light L22, L25 (see FIGS. 4 and 5) included in the ambient light L21 and reflected by the floating image formation optical system 20 passes through the floating image 12.

Further, the optical function adjustment unit 70a can also be an optical path adjustment unit that adjusts the optical path of the first light L1 emitted from the image display unit 10. In this case, the optical function adjustment unit 70a is an optical member including an electron barrier layer or a lens mechanism whose position is adjustable. The optical function control unit 257 changes the luminance of the image quality deterioration region R3 by driving the optical path adjustment unit so that the luminance of the ambient light passage region R30 approaches the luminance of the vicinal region in the vicinity of the ambient light passage region R30. Accordingly, the deterioration in the visibility of the observer visually recognizing the floating image 12 can be prevented even when the light L22, L25 (see FIGS. 4 and 5) included in the ambient light L21 and reflected by the floating image formation optical system 20 passes through the floating image 12.

The optical function adjustment unit 70b can also be an optical film capable of electronically controlling the reflectance or the diffusivity of the beam splitter 21. Specifically, the optical function adjustment unit 70b controls the reflectance or the diffusivity based on the incidence angle of light incident upon the inside or the surface of the beam splitter 21. The optical function adjustment unit 70c can also be an optical film capable of controlling the reflectance or the diffusivity of the retroreflective sheet 22. Specifically, the optical function adjustment unit 70c controls the reflectance or the diffusivity based on the incidence angle of light incident upon the surface of the retroreflective sheet 22.

Each optical function adjustment unit 70b, 70c can also be a liquid crystal film whose optical condition changes depending on a voltage change, for example. By this, the reflectance or the diffusivity of each of the beam splitter 21 and the retroreflective sheet 22 can be changed. Further, each optical function adjustment unit 70b, 70c can also be a plate-like optical element having a plurality of micromirrors arrayed on a two-dimensional plane, for example. In the cases where each optical function adjustment unit 70b, 70c includes a liquid crystal film or micromirrors, the optical function control unit 257 is capable of changing the optical path of the image light emitted from the image display unit 10 so that the display object included in the image 11 does not overlap with the image quality deterioration region R3. Therefore, the deterioration in the visibility of the observer visually recognizing the floating image 12 can be prevented.

<Effect of Second Embodiment>

As described above, the floating image display device 200 according to the second embodiment includes the optical function adjustment units 70a, 70b and 70c that adjust the optical functions of the image display unit 10, the beam splitter 21 and the retroreflective sheet 22 and the optical function control unit 257 that controls the optical function adjustment units 70a, 70b and 70c based on the image quality deterioration region R3. Accordingly, the deterioration in the observer's visibility can be prevented even when the light included in the ambient light and reflected by the floating image formation optical system 20 passes through the floating image 12.

Further, with the floating image display device 200 according to the second embodiment, the optical function adjustment units 70a, 70b and 70c are drive units that respectively drive the image display unit 10, the beam splitter 21 and the retroreflective sheet 22, and the optical function control unit 257 changes the position of the image display unit 10 so that the display object included in the image 11 does not overlap with the image quality deterioration region R3. Accordingly, the deterioration in the observer's visibility when the display object is displayed as the floating image 12 can be prevented.

DESCRIPTION OF REFERENCE CHARACTERS

10: image display unit, 11, 11a, 11b: image, 12, 12a, 12b: floating image, 20: image formation optical system, 21: beam splitter, 22: retroreflective sheet, 23: dihedral corner reflector array, 30: observer detection unit, 40: ambient light source detection unit, 51: viewpoint information acquisition unit, 52: ambient light information acquisition unit, 54:

image quality deterioration region estimation unit, 55: floating image display processing unit, 60: viewpoint information, 61: ambient light information, 70a, 70b, 70c: optical function adjustment unit, 80: eye, 90: ambient light source, 100, 200: floating image display device, 257: optical function control unit, R1, R2: display object, R3: image quality deterioration region, R30: ambient light passage region, L21: ambient light, L22, L25: light.

What is claimed is:

1. A floating image display device comprising:
an image display to display an image based on image data;
an image formation optical system to make the image form an image as a floating image; and
processing circuitry:
to acquire viewpoint information indicating a position of eyes of an observer;
to acquire ambient light information indicating information on ambient light heading for the image formation optical system;
to estimate an image quality deterioration region on the image display based on the viewpoint information, the ambient light information, and floating image formation structure information indicating at least one of a structure or an arrangement of the image formation optical system, wherein the image quality deterioration region corresponds to an ambient light passage region where light passes through the floating image and wherein the light that passes through the floating image is included in the ambient light, is reflected by the image formation optical system, and is heading for the position of the eyes; and
to correct the image based on the image quality deterioration region.

2. The floating image display device according to claim 1, wherein the processing circuitry corrects at least one of luminance, contrast, or a grayscale value of the image based on the image quality deterioration region.

3. The floating image display device according to claim 2, wherein the processing circuitry corrects the luminance of the image quality deterioration region so that the luminance of the ambient light passage region approaches the luminance of a vicinal region in a vicinity of the ambient light passage region.

4. The floating image display device according to claim 2, wherein the processing circuitry corrects the contrast of the image quality deterioration region so that the contrast of the ambient light passage region approaches the contrast of a vicinal region in a vicinity of the ambient light passage region.

5. The floating image display device according to claim 2, wherein the processing circuitry corrects the grayscale value of the image quality deterioration region so that the grayscale value of the ambient light passage region approaches the grayscale value of a vicinal region in a vicinity of the ambient light passage region.

6. The floating image display device according to claim 1, wherein the processing circuitry corrects at least one of a size or an arrangement of a display object included in the image based on the image quality deterioration region.

7. The floating image display device according to claim 6, wherein the processing circuitry corrects the at least one of the size or the arrangement so that the display object does not overlap with the image quality deterioration region.

8. The floating image display device according to claim 6, wherein
the display object includes a character region, and
the processing circuitry corrects the at least one of the size or the arrangement of the character region so that the character region does not overlap with the image quality deterioration region.

9. The floating image display device according to claim 6, wherein
the display object includes an illustration region, and
the processing circuitry corrects the at least one of the size or the arrangement of the illustration region so that the illustration region does not overlap with the image quality deterioration region.

10. The floating image display device according to claim 1, wherein the ambient light information includes information indicating at least one of a position of a light source of the ambient light or intensity of the ambient light.

11. The floating image display device according to claim 1, wherein the processing circuitry changes at least one of intensity, light directivity distribution, or chromaticity of light of the image based on the image quality deterioration region.

12. The floating image display device according to claim 1, wherein the image formation optical system includes:
an optical member to reflect first light as light of the image and to emit the reflected light in a predetermined emission direction as second light; and
a retroreflective member to reflect the second light towards the emission direction and to emit the reflected light as third light.

13. The floating image display device according to claim 1, further comprising:
a motor to adjust an optical function of at least one of the image display and the image formation optical system,
wherein the processing circuitry controls the motor based on the image quality deterioration region.

14. The floating image display device according to claim 13, wherein the motor drives at least one of the image display or the image formation optical system.

15. The floating image display device according to claim 14, wherein the processing circuitry changes a position of the image display so that a display object included in the image does not overlap with the image quality deterioration region.

16. The floating image display device according to claim 14, wherein the processing circuitry changes a position of the image formation optical system so that a display object included in the image does not overlap with the image quality deterioration region.

17. The floating image display device according to claim 1, wherein the image formation optical system includes a dihedral corner reflector array.

18. The floating image display device according to claim 1, further comprising a camera or sensor that detects the observer,
wherein the processing circuitry acquires the viewpoint information based on a result of the detection by the camera or sensor.

19. The floating image display device according to claim 1, further comprising a camera to detect a light source of the ambient light,
wherein the processing circuitry acquires the ambient light information based on a result of the detection by the camera.

20. A floating image display method performed by a floating image display device including an image display to display an image based on image data and an image formation optical system to make the image form an image as a floating image, the method comprising:

acquiring viewpoint information indicating a position of eyes of an observer;

acquiring ambient light information indicating information on ambient light heading for the image formation optical system;

estimating an image quality deterioration region on the image display based on the viewpoint information, the ambient light information, and floating image formation structure information indicating at least one of a structure or an arrangement of the image formation optical system, wherein the image quality deterioration region corresponds to an ambient light passage region where light passes through the floating image and wherein the light that passes through the floating image is included in the ambient light, is reflected by the image formation optical system, and is heading for the position of the eyes; and correcting the image based on the image quality deterioration region.

21. The floating image display device according to claim 1, wherein the image formation optical system forms the floating image in the air that exists between the image formation optical system and the observer.

22. A floating image display device comprising:

an image display to display an image based on image data;

an image formation optical system to make the image form an image as a floating image;

a motor to drive the image formation optical system; and processing circuitry:
  to acquire viewpoint information indicating a position of eyes of an observer;
  to acquire ambient light information indicating information on ambient light heading for the image formation optical system;
  to estimate an image quality deterioration region on the image display based on the viewpoint information, the ambient light information, and floating image formation structure information indicating at least one of a structure or an arrangement of the image formation optical system, wherein the image quality deterioration region corresponds to an ambient light passage region where light passes through the floating image and wherein the light that passes through the floating image is included in the ambient light, is reflected by the image formation optical system, and is heading for the position of the eyes;
  to correct the image based on the image quality deterioration region; and
  to control the motor based on the image quality deterioration region.

23. A floating image display method performed by a floating image display device including an image display to display an image based on image data, an image formation optical system to make the image form an image as a floating image, and a motor to drive the image formation optical system, the method comprising:

acquiring viewpoint information indicating a position of eyes of an observer;

acquiring ambient light information indicating information on ambient light heading for the image formation optical system;

estimating an image quality deterioration region on the image display based on the viewpoint information, the ambient light information, and floating image formation structure information indicating at least one of a structure or an arrangement of the image formation optical system, wherein the image quality deterioration region corresponds to an ambient light passage region where light passes through the floating image and wherein the light that passes through the floating image is included in the ambient light, is reflected by the image formation optical system, and is heading for the position of the eyes;

correcting the image based on the image quality deterioration region; and controlling the motor based on the image quality deterioration region.

* * * * *